US012169845B2

(12) United States Patent
Jones et al.

(10) Patent No.: US 12,169,845 B2
(45) Date of Patent: Dec. 17, 2024

(54) REAL-TIME ASSESSMENT OF INITIATED DATA EXCHANGES BASED ON STRUCTURED MESSAGING DATA

(71) Applicant: The Toronto-Dominion Bank, Toronto (CA)

(72) Inventors: Christopher Mark Jones, Villanova, PA (US); Barry Wayne Baird, Jr., Kennett Square, PA (US); Claude Bernell Lawrence, Jr., Philadelphia, PA (US); Jonathan Joseph Prendergast, West Chester, PA (US)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 17/469,312

(22) Filed: Sep. 8, 2021

(65) Prior Publication Data
US 2022/0198501 A1    Jun. 23, 2022

Related U.S. Application Data

(60) Provisional application No. 63/126,829, filed on Dec. 17, 2020.

(51) Int. Cl.
*G06Q 30/0217*     (2023.01)
*G06Q 20/32*       (2012.01)
(Continued)

(52) U.S. Cl.
CPC ..... *G06Q 30/0217* (2013.01); *G06Q 20/3223* (2013.01); *G06Q 20/326* (2020.05); *G06Q 20/389* (2013.01); *G06Q 30/0282* (2013.01)

(58) Field of Classification Search
CPC .......... G06Q 30/0217; G06Q 20/3223; G06Q 20/326; G06Q 20/389; G06Q 30/0282
(Continued)

(56) References Cited

U.S. PATENT DOCUMENTS 7,680,737 B2    3/2010    Smith, Jr. et al.
7,813,965 B1    10/2010   Robinson et al.
(Continued)

FOREIGN PATENT DOCUMENTS

WO    2003025712         3/2003
WO    WO-03025712 A2 *   3/2003   ............. G06Q 30/02
(Continued)

OTHER PUBLICATIONS

Paul Rogers, The Definitive Guide to eCommerce Product Reviews, 2017 (Year: 2017).*
(Continued)

*Primary Examiner* — Tarek Elchanti
(74) *Attorney, Agent, or Firm* — NIXON PEABODY LLP

(57) ABSTRACT

The disclosed exemplary embodiments include computer-implemented processes that assess initiated data exchanges in real-time based on structured messaging data. In some examples, an apparatus may receive a message associated with an exchange of data involving a first counterparty and a second counterparty and characterizing a real-time payment requested from the second counterparty by the first counterparty. The apparatus may determine a first identifier of the first counterparty based on elements of the message data disposed within corresponding message fields, and transmit notification data to a device operable by the second counterparty, which may present portions of the notification data within a digital interface. The apparatus may receive review data indicative of a review associated with the data exchange from the device, and store the first identifier and the review data in a data repository.

24 Claims, 12 Drawing Sheets

(51) Int. Cl.
*G06Q 20/38* (2012.01)
*G06Q 30/0282* (2023.01)

(58) Field of Classification Search
USPC .................. 705/40, 7.32, 14.19, 39; 709/206
See application file for complete search history.

(56) References Cited

U.S. PATENT DOCUMENTS

| | | | |
|---|---|---|---|
| 7,827,052 | B2 | 11/2010 | Scott et al. |
| 7,899,712 | B2 | 3/2011 | May et al. |
| 8,612,339 | B2 | 12/2013 | Rose et al. |
| 8,712,912 | B2 | 4/2014 | Carlson et al. |
| 8,751,387 | B2 | 6/2014 | Hougland et al. |
| 9,792,600 | B1 * | 10/2017 | Grassadonia ........ G06Q 20/227 |
| 2005/0004868 | A1 * | 1/2005 | Klatt .................... G06Q 20/04 |
| | | | 705/40 |
| 2007/0288312 | A1 | 12/2007 | Wang |
| 2013/0066800 | A1 | 3/2013 | Falcone et al. |
| 2013/0226798 | A1 | 8/2013 | Orttung et al. |
| 2014/0095638 | A1 * | 4/2014 | Chen .................... H04L 51/046 |
| | | | 709/206 |
| 2014/0279444 | A1 * | 9/2014 | Kassemi ............ G06Q 20/3255 |
| | | | 705/39 |
| 2016/0196566 | A1 * | 7/2016 | Murali ............... G06Q 30/0203 |
| | | | 705/7.32 |
| 2017/0221066 | A1 | 8/2017 | Ledford et al. |
| 2018/0097901 | A1 * | 4/2018 | Ramachandra ......... H04W 4/14 |
| 2019/0378182 | A1 | 12/2019 | Weinflash et al. |
| 2022/0076248 | A1 * | 3/2022 | Kapoor ................ G06Q 20/385 |

FOREIGN PATENT DOCUMENTS

| | | | | |
|---|---|---|---|---|
| WO | WO-2013044286 A1 * | 4/2013 | ............ G06Q 20/02 |
| WO | 2016190810 | 1/2016 | |

OTHER PUBLICATIONS

Aran Khanna, Venmo'ed: Sharing Your Payment Data With the World, 2014 (Year: 2014).*
Quibria, "Introduction to ISO 20022 For U.S. Financial Institutions," NACHA—The Electronic Payments Association, 2015 (45 pages).
Wandhofer et al., "The Future of Correspondent Banking Cross Border Payments," Swift Institute, Oct. 10, 2018 (63 pages).

* cited by examiner

| Requested Execution Date | 2021-10-01 | |
|---|---|---|
| | | ← 220 |
| Debtor | | |
| Name | John Q. Smith | |
| Postal Address | | |
| Street Name | N Street NW | |
| Bulding Number | 3108 | ← 224 |
| Postal Code | 20007 | |
| Town Name | Washington, D.C. | |
| Country | US | |
| | | |
| Debtor Account | | |
| Identification | XXXX-1234-5678-9012 | ← 226 |
| | | |
| Amount | | |
| Instructed Amount | 930.00 | ← 222 |
| Currency | USD | |
| | | |
| Creditor | | |
| Name | Josh's Stone and Landscaping | |
| Postal Address | | |
| Street Name | Main Street | |
| Bulding Number | 1234 | ← 228 |
| Postal Code | 22046 | |
| Town Name | Falls Church | |
| Country | US | |
| | | |
| Creditor Account | | |
| Identification | XXXX-9012-3456-7890 | ← 230 |
| | | |
| Remittance Information | | |
| Unstructured | http://www.JStoneLandscaping.com/receipt?custid='1234'?zip='20007' | ← 234 |

FIG. 2B

REAL-TIME ASSESSMENT OF INITIATED DATA EXCHANGES BASED ON STRUCTURED MESSAGING DATA

CROSS-REFERENCE TO RELATED APPLICATION

This application claims the benefit of priority to U.S. Provisional Patent Application No. 63/126,829, filed on Dec. 17, 2020, the entire disclosure of which is expressly incorporated herein by reference to its entirety.

TECHNICAL FIELD

The disclosed embodiments generally relate to computer-implemented systems and processes that assess initiated data exchanges in real-time based on structured messaging data.

BACKGROUND

Today, the mass adoption of smart phones and digital payments within the global marketplace drives an increasingly rapid adoption of real-time payment (RTP) technologies by financial institutions, consumers, vendors and merchants, and other participants in the payment ecosystem. Many RTP technologies emphasize data, messaging, and global interoperability and in contrast to many payment rails, such as those that support credit card payments, embrace the near ubiquity of mobile technologies in daily life to provide, to the participants in the RTP ecosystem, real-time service and access to funds.

SUMMARY

In some examples, an apparatus includes a communications interface, a memory storing instructions, and at least one processor coupled to the communications interface and to the memory. The at least one processor is configured to execute the instructions to receive, via the communications interface, a message associated with an exchange of data involving a first counterparty and a second counterparty. The message includes elements of message data disposed within corresponding message fields, and the message data characterizes a real-time payment requested from the second counterparty by the first counterparty. The at least one processor is further configured to execute the instructions to determine a first identifier of the first counterparty based on the elements of the message data, and to transmit, via the communications interface, notification data to a device operable by the second counterparty. The notification data includes the first identifier and digital content, and the notification data causes an application program executed at the device to present the first identifier and at least a portion of the digital content within a digital interface. The at least one processor is further configured to execute the instructions to receive, via the communications interface, review data indicative of a review associated with the data exchange from the device, and store the first identifier and the review data in the memory.

In other examples, a computer-implemented method includes receiving, using at least one processor, a message associated with an exchange of data involving a first counterparty and a second counterparty. The message includes elements of message data disposed within corresponding message fields, and the message data characterizes a real-time payment requested from the second counterparty by the first counterparty. The computer-implemented method also includes, using the at least one processor, determining a first identifier of the first counterparty based on the elements of the message data, and transmitting notification data to a device operable by the second counterparty. The notification data includes the first identifier and digital content, and the notification data causes an application program executed at the device to present the first identifier and at least a portion of the digital content within a digital interface. The computer-implemented method includes, using the at least one processor, receiving review data indicative of a review associated with the data exchange from the device, and storing the first identifier and the review data with a data repository.

Further, in some examples, a tangible, non-transitory computer-readable medium stores instructions that, when executed by at least one processor, cause the at least one processor to perform a method that includes receiving a message associated with an exchange of data involving a first counterparty and a second counterparty. The message includes elements of message data disposed within corresponding message fields, and the message data characterizes a real-time payment requested from the second counterparty by the first counterparty. The method also includes determining an identifier of the first counterparty based on the elements of the message data, and transmitting notification data to a device operable by the second counterparty. The notification data includes the identifier and digital content, and the notification data causes an application program executed at the device to present the identifier and at least a portion of the digital content within a digital interface. The method also includes receiving review data indicative of a review associated with the data exchange from the device, and storing the first identifier and the review data with a data repository.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

BRIEF DESCRIPTION OF THE DRAWINGS

FIG. 2B illustrates portions of an exemplary request for payment (RFP), in accordance with some exemplary embodiments.

Like reference numbers and designations in the various drawings indicate like elements.

DETAILED DESCRIPTION

Figure 1:
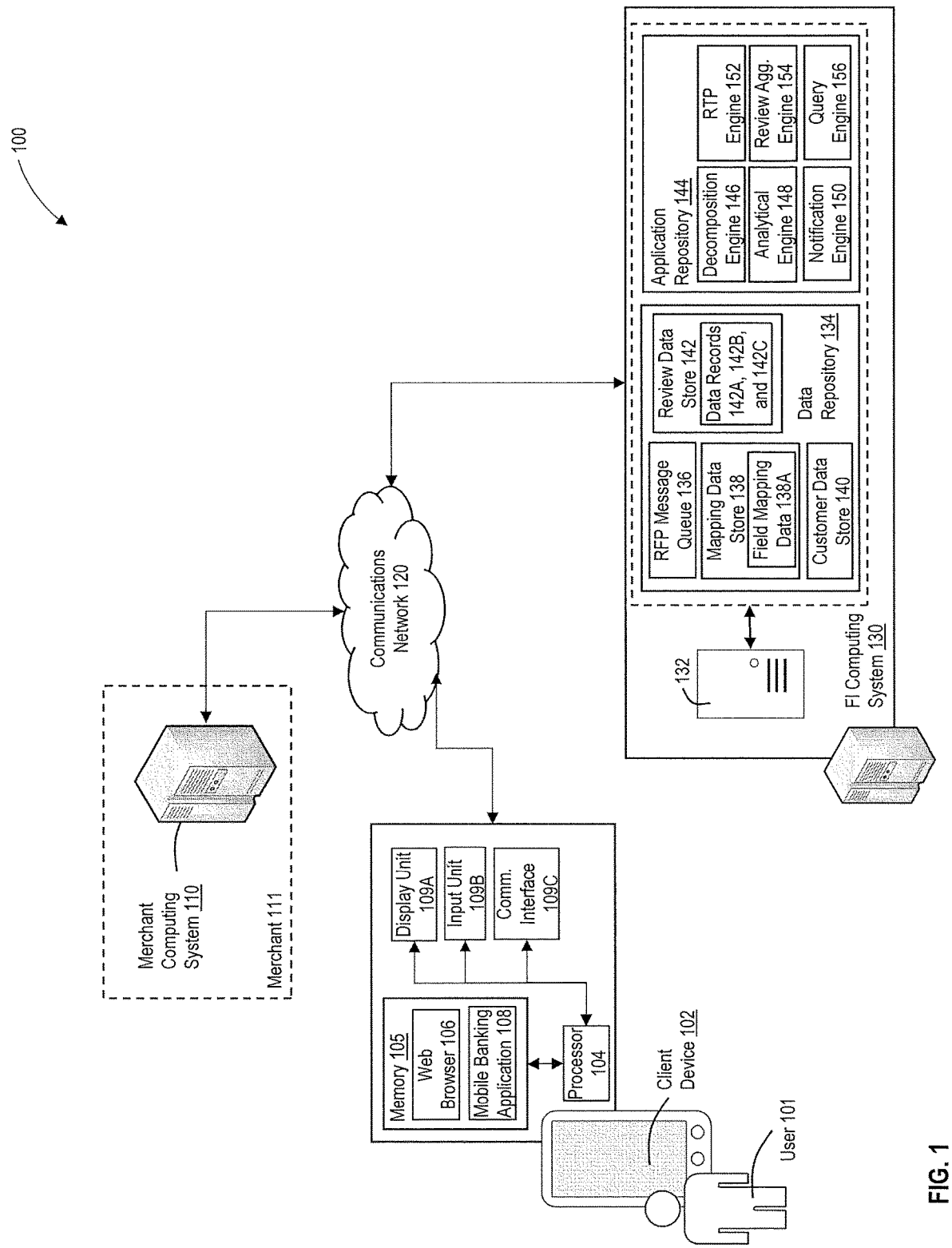
FIG. 1 is a block diagram of an exemplary computing environment, in accordance with some exemplary embodiments.

This specification relates to exemplary, computer-implemented processes that, based on elements of structured or unstructured message data characterizing an exchange of data initiated between a first counterparty and a second counterparty, may provision elements of digital content associated with at least one of the data exchange or the first counterparty to a computing system or device operable by the second counterparty, and based on the provisioned elements of digital content, obtain information characterizing one or more reviews associated with the data exchange. In some instances, certain of the exemplary, computer-implemented processes described herein may provision the elements of digital to the computing system or device operable by the second counterparty, and may obtain the information characterizing one or more reviews associated with the data exchange, in real-time and contemporaneously with the initiation of the data exchange.

By way of example, the first counterparty may correspond to a merchant that offers products or services for sale to one or more customers, such as, but not limited to, the second counterparty, and the data exchange may include a purchase transaction initiated by the customer and involving one or more of the products or services offered for sale by the merchant. Further, and as described herein, the customer may be associated with, or operate, a computing system or device (e.g. a "client device") that executes one or more locally maintained application programs, and the merchant may be associated with, or operate, a computing system or device (e.g. a "merchant computing system") that executes one or more locally maintained application programs.

In some instances, the merchant computing system may generate one or more elements of transaction data associated with the purchase transaction, which identify, among other things, the one or more products or services involved in the purchase transaction, and may obtain elements of payment data that identify a payment instrument held by the customer and available to fund the initiated purchase transaction. The payment instrument may include, but is not limited to, a credit card account issued by a financial institution of the customer or by an additional, unrelated financial institution, or a checking, savings, or other deposit account issued by and maintained at the financial institution of the customer or at the additional, unrelated financial institution. For example, the merchant computing system may be communicatively coupled to a point-of-sale terminal, which may receive one or more of the elements of payment data from the customer (e.g., via a input device capable of interrogating a magnetic strip or an integrated circuit included within a physical payment card, or via wireless channel of communication with the client device, etc.), and which may provision the received elements of payment data to the merchant computing system. In other examples, the merchant computing system may receive one or more of the elements of data across a corresponding channel of communications established programmatically between one or more of the one or more locally maintained application programs executed at the merchant computing system and the client device.

The merchant computing system may also perform operations that authorize the initiated purchase transaction using the available payment instrument, e.g., based on portions of the generated transaction data and the obtained payment data. By way of example, the merchant computing may generate a transaction-processing message that includes portions of the data characterizing the now-authorized transaction, and may transmit the transaction-processing message to a computing system associated with a transaction processing network (e.g., a payment rail or payment network), which may perform additional operations that reconcile, settle, and clear the authorized purchase transaction in accordance with the transaction data. For instance, the merchant computing system may generate, and transmit, the transaction-processing message to the computing system associated with the transaction processing network at predetermined intervals subsequent to the initiation and authorization of the purchase transaction, such as, but not limited to, at a completion of a business day or a completion of a calendar day. Further, and upon completion of the reconciliation, clearance, and settlement processes at the predetermined intervals, funds associated with the purchase transaction may be credited to an account held by the merchant, and may be accessible to that merchant for withdrawal from the merchant's financial institution.

In other instances, and through an implementation of one or more real-time payment (RTP) technologies, the merchant computing system may generate elements of messaging data that request, from the customer, payment for the one or more purchased products or services in real-time and contemporaneously with the initiated purchase transaction, e.g., a "real-time" payment. For example, the generated elements of messaging data may populate, and be maintained within, message fields of a request-for-payment (RFP) message formatted and structured in accordance with one or more standardized data-exchange protocols, such as the ISO 20022 standard for electronic data exchange between financial institutions.

As described herein, the message fields of the RFP message may include discrete elements of structured or unstructured data that identify and characterize the initiated purchase transaction, the available payment instrument, and the counterparties to the initiated purchase transaction, e.g., the customer and the merchant. For example, the message fields of the RFP message may include, but are not limited to structured elements of customer data that identify the customer (e.g., a name of the customer, a unique, alphanumeric identifier assigned to the customer, etc.), and structured elements of merchant data that identify the merchant (e.g., a merchant name, a standard industrial classification (SIC) code, etc.) and one or more portions of a postal address associated with the merchant. The message fields of the RFP message may also include, but are not limited to, structured elements of transaction data that characterize the initiated purchase transaction (e.g., a total transaction amount, a pre-tax transaction amount, a transaction time or date, etc.) and structured elements of payment data identifying and characterizing the payment instrument that funds the initiated purchase transaction (e.g., a payment method, a requested payment account, identifiers of a source account and a destination account associated with a requested transfer of funds, etc.). Further, in some examples, the message fields of the RFP message may also include a hyperlink to additional information, such as remittance data, that characterizes the initiated purchase transactions and is maintained by one or more computing systems, such as the merchant computing system described herein.

In some examples, the elements of structured or unstructured data maintained within the message fields of exemplary, ISO-20022-compliant RFP messages described herein may extend beyond the often-limited content of the transaction-processing messages associated with, and broadcast across, many payment rails and transaction-processing networks. Further, when intercepted and processed by a computing system of the financial institution of the customer (e.g., an "FI" computing system), these elements of structured or unstructured RFP message data may be processed by the FI computing system to obtain or derive additional information characterizing the purchase transaction, the customer, or the merchant, and to provision, to the client device, elements of digital content of relevance to the purchase transaction, the customer, or the merchant in real time and contemporaneously with the initiation of the transaction. Certain of these exemplary processes, which leverage ISO-20022-compliant RFP messages to provision digital content to a device of a customer in real-time and contemporaneously with a transaction initiated by that customer derive, may be implemented in addition to, or as an alternate to, processes involving payment rails, transaction-processing messages, and corresponding messaging protocols, which provision data characterizing a cleared and settled transaction to the computing system of the customer's financial institution subsequent to the initiation of the transaction.

Upon interception of an ISO-20022-compliant RFP message associated with a transaction involving the merchant and the customer, such as the purchase transaction described herein, the FI computing system provision a payment notification to an application program executed at the client device that, upon presentation within a corresponding digital interface, prompts the customer to provide an approval of the real-time payment requested by the merchant, e.g., contemporaneously with the initiated transaction. Certain of the exemplary RTP processes described herein may, when implemented collectively by the computing systems of the financial institution, of the merchant, and of the customer, facilitate a reconciliation, settlement, and clearance of the initiated transaction in real-time and without conventional payment rails and transaction processing networks, and may reduce instances of fraudulent activity and chargebacks characteristic of the transaction reconciliation, clearance, and settlement processes involving payment rails and transaction processing-messages, e.g., as the merchant computing system receives the customer's approval of the requested payment contemporaneously with the initiation of the transaction and prior to any provisioning of the one or more purchased products or services to the customer.

Further, and as described herein, the payment notification may also include one or more elements of digital content that, upon presentation within a corresponding digital interface, prompt the customer provide at least one review associated with the purchase transaction, such as, but not limited to, a review of the customer's interaction, or experience, with the merchant during the purchase transaction (e.g., a "counterparty-specific" review), a review of a product involved in the purchase transaction (e.g., a "product-specific" review), or a review of a service provisioned by the merchant and involved in the purchase transaction (e.g., a "service-specific" review). In some examples, the FI computing system may receive data that characterizes the counterparty-specific review, the product-specific review, or the service-specific review from the client device in conjunction with, or contemporaneously with, additional data confirming an approval, or a rejection, of the real-time payment requested from the customer by the merchant using any of the exemplary RTP processes described herein.

Responsive to a confirmed approval of the requested, real-time payment by the customer, the FI computing system may perform operations, described herein, to maintain the received counterparty-specific review, product-specific review, or service-specific review in a locally accessible data repository, and to compute aggregated values of the counterparty-specific review, product-specific review, or service-specific review on a merchant-by-merchant basis, or for groups of merchants that share common merchant characteristics, geographic characteristics, or combinations thereof. In some instances, each of the counterparty-, product-, or service-specific review of the merchant may correspond to a "verified" review associated with, and linked to, not only an actual, purchase transaction involving a corresponding customer, but also to a real-time payment approved by the corresponding customer to fund the initiated purchase transaction. As described herein, the FI computing system may also perform operations that provision portions to the verified counterparty-, product-, or service-specific reviews, and/or the aggregated values of these verified counterparty-, product-, or service-specific reviews, to the client device or the merchant computing system, and further, that facilitate a query of the aggregated values of these verified counterparty-, product-, or service-specific reviews by the customer or the merchant via a digital portal generated by application programs executed by respective ones of client device or merchant computing system.

Although existing crowd-sourced platforms may solicit merchant reviews from customers, and may perform operations that aggregate the received merchant reviews and expose these aggregated values of the merchant reviews for review and query by network-connected devices, many existing crowd-sourced platforms fail to impose any affirmative link between a solicited, received, and/or aggregated value of a merchant review provisioned by a corresponding customer and an initiated, and subsequently funded and executed, purchase transaction involving the corresponding customer. As the merchant reviews solicited, received, and/or aggregated by these existing crowd-sourced platforms often remain unlinked to any actual purchase transaction involving a corresponding customer and merchant, these merchant reviews represent "unverified" merchant reviews that, in some instances, inaccurately represent a customer sentiment regarding the corresponding merchant or products and services provisioned by the corresponding merchant. Certain of these exemplary processes, which leverage verified reviews provisioned actual customers of corresponding merchants, and which are linked to, and associated with, initiated, and subsequently funded and executed, purchase transactions involving the actual customers and the corresponding merchants, may be implemented in addition to, or as an alternate to, processes implemented by many existing, crowd-sourced platforms that solicit merchant reviews from customers.

I. Exemplary Computing Environments

FIG. 1 is a diagram illustrating an exemplary computing environment 100 that includes, among other things, one or more computing devices, such as a client device 102, and one or more computing systems, such as a merchant computing system 110 and a financial institution (FI) system 130, each of which may be operatively connected to, and interconnected across, one or more communications networks, such as communications network 120. Examples of communications network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN)

connecting multiple wireless LANs, and a wide area network (WAN), e.g., the Internet.

Client device 102 may include a computing device having one or more tangible, non-transitory memories, such as memory 105, that store data and/or software instructions, and one or more processors, e.g., processor 104, configured to execute the software instructions. The one or more tangible, non-transitory memories may, in some aspects, store application programs, application engines or modules, and other elements of code executable by the one or more processors, such as, but not limited to, an executable web browser 106 (e.g., Google Chrome™, Apple Safari™, etc.), and additionally or alternatively, an executable application associated with FI computing system 130 (e.g., mobile banking application 108). In some instances, not illustrated in FIG. 1, memory 105 may also include one or more structured or unstructured data repositories or databases, and client device 102 may maintain one or more elements of device data within the one or more structured or unstructured data repositories or databases. For example, the elements of device data may uniquely identify client device 102 within computing environment 100, and may include, but are not limited to, an Internet Protocol (IP) address assigned to client device 102 or a media access control (MAC) layer assigned to client device 102.

Client device 102 may include a display unit 109A configured to present interface elements to a corresponding user, such as a user 101, and an input unit 109B configured to receive input from user 101, e.g., in response to the interface elements presented through display unit 109A. By way of example, display unit 109A may include, but is not limited to, an LCD display unit or other appropriate type of display unit, and input unit 109B may include, but is not limited to, a keypad, keyboard, touchscreen, voice activated control technologies, or appropriate type of input unit. Further, in additional aspects (not illustrated in FIG. 1), the functionalities of display unit 109A and input unit 109B may be combined into a single device, e.g., a pressure-sensitive touchscreen display unit that presents interface elements and receives input from user 101. Client device 102 may also include a communications interface 109C, such as a wireless transceiver device, coupled to processor 104 and configured by processor 104 to establish and maintain communications with communications network 120 via one or more communication protocols, such as WiFi®, Bluetooth®, NFC, a cellular communications protocol (e.g., LTE®, CDMA®, GSM®, etc.), or any other suitable communications protocol.

Examples of client device 102 may include, but not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs)), an embedded computing device (e.g., in communication with a smart textile or electronic fabric), and any other type of computing device that may be configured to store data and software instructions, execute software instructions to perform operations, and/or display information on an interface device or unit, such as display unit 109A. In some instances, client device 102 may also establish communications with one or more additional computing systems or devices operating within environment 100 across a wired or wireless communications channel, e.g., via the communications interface 109C using any appropriate communications protocol. Further, user 101 may operate client device 102 and may do so to cause client device 102 to perform one or more exemplary processes described herein.

Merchant computing system 110 and FI computing system 130 may each represent a computing system that includes one or more servers and one or more tangible, non-transitory memory devices storing executable code, application engines, or application modules. Each of the one or more servers may include one or more processors, which may be configured to execute portions of the stored code, application engines or modules, or application programs to perform operations consistent with the disclosed exemplary embodiments. For example, as illustrated in FIG. 1, the one or more servers of FI computing system 130 may include server 132 having one or more processors configured to execute portions of the stored code, application engines or modules, or application programs maintained within the one or more tangible, non-transitory memories. Further, each of merchant computing system 110 and FI computing system 130 may also include one or more communications interfaces, such as one or more wireless transceivers, coupled to the one or more processors for accommodating wired or wireless internet communication across network 120 with other computing systems and devices operating within environment 100 (not illustrated in FIG. 1).

In some instances, merchant computing system 110 and/or FI computing system 130 may correspond to a discrete computing system, although in other instances, merchant computing system 110 or FI computing system 130 may correspond to a distributed computing system having multiple, computing components distributed across an appropriate computing network, such as communications network 120 of FIG. 1A, or those established and maintained by one or more cloud-based providers, such as Microsoft Azure™, Amazon Web Services™, or another third-party, cloud-services provider. Further, in some instances, one or more of merchant computing system 110 and FI computing system 130 may be incorporated into a single computing system, or may be incorporated into multiple computing systems.

By way of example, merchant computing system 110 may be associated with, or operated by, a merchant 111 that offers products or services for sale to one or more customers, such as, but not limited to, user 101 that operates client device 102. Further, and as described herein, FI computing system 130 may be associated with, or operated by, a financial institution that offers financial products or services to one or more customers, such as, but not limited to, user 101. The financial products or services may, for example, include a payment instrument issued to user 101 by the financial institution and available to fund the initiated purchase transaction, and examples of the payment instrument may include, but are not limited to, a credit card account issued by the financial institution or a checking, savings, or other deposit account issued by and maintained at the financial institution.

In some instances, FI computing system 130 may perform any of the exemplary processes described herein to obtain, receive, or intercept a request-for-payment (RFP) message associated with the initiated purchase transaction between a first counterparty (e.g., merchant 111 of FIG. 1) and a second counterparty (e.g., user 101 of FIG. 1). As described herein, the received RFP message may be formatted and structured in accordance with one or more standardized data-exchange protocols, such as the ISO 20022 standard for electronic data exchange between financial institutions. Further, and based on elements of mapping data that characterize a structure, composition, or format of one or more data fields of the ISO-20002-compliant RFP message, FI computing system 130 may perform any of the exemplary processes described herein to decompose the received RFP message and obtain data characterizing user 101, merchant 111, and the purchase transaction. Further, FI computing system 130 may perform any of the exemplary processes described herein to identify, and obtain, one or more elements of digital content associated with the initiated purchase transaction or the first counterparty. For example, the one or more elements of digital content may, upon presentation within a corresponding digital interface by client device 102, prompt user 101 to approve or deny the requested payment from the merchant 111, and further, prompt user 101 to provide a review of merchant 111 and additionally, or alternatively, one or more reviews of a product or service involved in the purchase transaction To facilitate a performance of one or more of these exemplary processes, FI computing system 130 may maintain, within the one or more tangible, non-transitory memories, a data repository 134 that includes, but is not limited to, a request-for-payment (RFP) message queue 136, a mapping data store 138, a customer data store 140, and a review data store 142. RFP message queue 136 may include one or more discrete RFP messages received by FI computing system 130 using any of the exemplary processes described herein. In some instances, the RFP messages maintained within RFP message queue 136 may be prioritized in accordance with a time or date of receipt by FI computing system 130 or with requested payment data associated with each of the RFP messages, and each of the prioritized RFP messages may be associated with a corresponding temporal pendency. Further, FI computing system 130 may perform any of the exemplary processes described herein to provision elements of notification data associated with each of the prioritized RFP message to a computing system or device associated with a corresponding customer (e.g., client device 102 associated with user 101), and FI computing system 130 may perform operations that maintain each of the prioritized RFP messages within RFP message queue 136 until a receipt, at FI computing system 130, of confirmation data from corresponding ones of the computing systems or devices indicating an approval, or a rejection, of the corresponding requested payment, or until an expiration of the corresponding pendency period.

Mapping data store 138 may include structured or unstructured data records that maintain one or more elements of field mapping data 138A. For example, and as described herein, FI computing system 130 may receive, obtain, or intercept one or more RFP messages, each of which may be formatted and structured in accordance with a corresponding, standardized data-exchange protocol, such as the ISO 20022 standard for electronic data exchange between financial institutions. In some instances, the one or more elements of field mapping data 138A may characterize a structure, composition, or format of the message data populating one or more data fields of the ISO-20002-compliant RFP message, or a corresponding RFP message compliant with an additional, or alternate, standardized data-exchange protocol. In some instances, customer data store 140 may include structured or unstructured data records that maintain information identifying and characterizing one or more customers of the financial institution, and further, interactions between these customers and not only the financial institution, but also other unrelated third parties, such as the merchants or retailers described herein.

Further, ratings data store 142 may include structured or unstructured data records 142A that identify and characterize discrete customer reviews of counterparties to, or products or services associated with, purchase transactions involving one or more customers of the financial institution. As described herein, each of the customer reviews may be specified by a corresponding customer of the financial institution (such as, but not limited to, user 101), and may be provisioned to FI computing systems 130 by a device operable by that corresponding customer (such as, but not limited to, client device 102) using any of the exemplary processes described herein. Further, as each of the purchase transactions may be associated with a corresponding ISO-20022-compliant RFP message, which links the corresponding customer to a particular one of the purchase transactions, each of these customer reviews may represent a verifiable review (e.g., a numerical rating, etc.) linked to an actual purchase transaction initiated by, or involving a corresponding customer of the financial institution, and to a requested, and approved, real-time payment that funds the actual purchase transaction.

In some instances, the discrete customer reviews may include, but are not limited to, one or more counterparty-specific reviews, one or more product-specific reviews, and additionally, or alternatively, one or more service-specific reviews, and each of the counterparty-, product-, and service-specific reviews may correspond to a numerical rating indicative of a satisfaction of a particular customer with a respective counterparty to, or a respective product or service associated with, a particular purchase transaction (and a corresponding ISO-20022-complaint RFP message). For example, the numerical rating representative of each of the discrete customer reviews may be disposed within a range from zero to five (e.g., with zero being indicative of minimal customer satisfaction and five being indicative of a maximum customer satisfaction), zero to unity (e.g., with zero being indicative of minimal customer satisfaction and unit being indicative of a maximum customer satisfaction), or any additional or alternate numerical range appropriate to the customers, the merchants, or the financial institution. Further, structured or unstructured data records 142A may also associate each of the discrete customer reviews with an identifier of a corresponding customer of the financial institution (e.g., a customer name, an alphanumeric login credential, a biometric credential, etc.), and at least one of an identifier of a corresponding merchant (e.g., a name of merchant 111, an alphanumeric identifier of merchant 111, a standard industrial classification (SIC) code or merchant category code (MCC) associated with merchant 111, etc.) or an identifier of a corresponding product or service (e.g., a product or service name or type, etc.).

Additionally, in some instances, ratings data store 142 may include structured or unstructured data records 142B that identify and characterize aggregated values of customer reviews of the counterparties to, or the products or services associated with, the purchase transactions involving the one or more customers of the financial institution. By way of example, the aggregated values of the customer reviews maintained within structured or unstructured data records 142B may include an arithmetic or geometric mean of the discrete customer ratings (e.g., as maintained within structured or unstructured data records 142A) associated with a particular counterparty (such as, but not limited to merchant 111) and additionally, or alternatively, with a particular product or service during one or more temporal intervals, such as, but not limited to, a prior calendar week, a prior calendar month, a prior calendar year, or any other appropriate temporal interval. Further, in some examples, FI computing system 130 may perform any of the exemplary processes described to compute the aggregated values of the counterparty-, product, or service-specific reviews based on discrete customer reviews specified by all customers of the financial institution, or specific by subsets of the customers of the financial institution associated with particular geographic characteristics (e.g., customers that reside in a geographic region that includes a location of merchant 111) or particular demographic characteristics (e.g., a range of ages, etc.). Further, structured or unstructured data records 1426 may also associate each of the aggregated values of the customer reviews with a corresponding one of an identifier of a corresponding counterparty (e.g., the name of merchant 111, the alphanumeric identifier of merchant 111, the SIC code or MCC of merchant 111, etc.) or an identifier of a corresponding product or service (e.g., a product or service name or type, etc.), either alone or in conjunction within data identifying the corresponding temporal interval or corresponding subset of the customers of the financial institution.

Review data store 142 may include further structured or unstructured data records 142C maintaining elements of digital content that, when rendered for presentation within a digital interface by one or more application programs executed by client device 102, prompt user 101 to provide a review (e.g., a numerical rating) of a counterparty, product, and/or service associated with a transaction characterized by a received, obtained, or intercepted RFP message. In some instances, the one or more elements of digital content may, when rendered for presentation within the digital interface, also provision to user 101 a graphical representation of one or more aggregated values that characterize the customer reviews associated with the counterparty, product, or service (e.g., as maintained within corresponding ones of structured or unstructured data records 142B). Further, although not illustrated in FIG. 1, structured or unstructured data records 142C may maintain the one or more elements of digital content in conjunction with metadata that identifies a counterparty, product, and/or service associated with the corresponding one of the elements of digital content (e.g., the customer, merchant, product, or service identifiers described herein). Further, in some instances, the structured or unstructured data records 142C of review data store 142 may store each of the elements of digital content in conjunction with one or more elements of layout data, which specify a disposition of the elements of digital content, or visual characteristics of the elements of digital content, when rendered for presentation within a corresponding digital interface by one or more application programs executed by client device 102.

Further, and to facilitate the performance of any of the exemplary processes described herein, FI computing system 130 may also maintain, within the one or more tangible, non-transitory memories, an application repository 144 that maintains, among other things, a decomposition engine 146, an analytical engine 148, a notification engine 150, an RTP engine 152, a review aggregation engine 154, and a query engine 156, each of which may be executed by the one or more processors of server 132.

For example, and upon execution by the one or more processors of server 132, executed decomposition engine 146 may perform any of the exemplary processes described herein to obtain field mapping data 138A from mapping data store 138, to apply field mapping data 138A to a received, obtained, or intercepted RFP message, and based on the application of field mapping data 138A to the RFP message, to decompose the RFP message and obtain elements of message data that not only identify and characterize each counterparty involved in an initiated purchase transaction (e.g., user 101 and merchant 111, described herein), but that also characterize the initiated purchase transaction. Further, and upon execution by the one or more processors of server 132, executed analytical engine 148 may perform any of the exemplary processes described herein to process the elements of message data obtained from the message fields of the decomposed RFP message, and obtain additional data identifying or characterizing one or more of the counterparties to the purchase transaction and additionally, or alternatively, a product or service involved in the purchase transaction.

Upon execution by the one or more processors of FI computing system 130, notification engine 150 may perform any of the exemplary processes described herein to generate one or more elements of a payment notification that, when provisioned to client device 102 by FI computing system 130, cause one or more application programs executed by client device 102 to present interface elements within a corresponding digital interface that prompt user 101 to provide an approval of the real-time payment requested by merchant 111 via the RFP message, e.g., contemporaneously with the initiation of the purchase transaction. Further, in some examples, executed notification engine 150 may perform any of the exemplary processes described herein to identify one or more of the elements of digital content maintained within data records 142C of ratings data store 142, which prompt user 101 to provide a review of the counterparty, product, or service associated with the purchase transaction (or that provision aggregate values of prior customer reviews of the counterparty, product, or service associated with the initiated purchase transaction), and to package the one or more identified elements of digital content into corresponding portion of a review notification, e.g., for presentation within one or more display screen or windows of the corresponding digital interface.

In some examples, upon execution by the one or more processors of FI computing system 130, RTP engine 152 may perform any of the exemplary processes described herein to execute a real-time payment requested from user 101 by merchant 111 based on, and responsive to, data indicating an approval of the requested, real-time payment by user 101. Upon execution by the one or more processors of FI computing system 130, review aggregation engine 154 may also perform any of the exemplary processes described to generate aggregated values of counterparty-, product-, or service-specific reviews on a counterparty-by-counterparty basis, or for groups of counterparties that exhibit common values of counterparty characteristics (e.g., a common SIC code, a common MC, etc.) or common values of geographic parameters (e.g., a common zip code, etc.). Further, upon execution by the one or more processors of FI computing system 130, executed query engine 156 may perform any of the exemplary processes described herein to receive, and respond to, queries of the aggregated values of the customer reviews maintained within data records 142B of review data store 142 (e.g., as generated by one or more participants in the RTP ecosystem).

II. Computer-Implemented Processes for Real-Time Assessments of Initiated Data Exchanges Based on Structured Messaging Data As described herein, a customer of the financial institution, such as user 101, may elect to initiate a initiate a purchase of one or more products or services from a particular merchant, such as merchant 111. By way of example, merchant 111 may include a local landscaping company (e.g., "Josh's Stone and Landscape"), and user 101 may engage the local landscaping company to perform a landscaping project at user 101's home within the Georgetown neighborhood of Washington, D.C., in accordance with an agreed-upon budget (e.g., under US $1,000.00) and a pre-determined schedule (e.g., on or before Oct. 1, 2021). In some instances, merchant 111 may completed the landscaping project on Sep. 30, 2021, and upon completion of the landscaping project, an application program 202 (such as, but not limited to, an accounting application, etc.) executed by merchant computing system 110 may perform operations that generate, and store within a locally accessible data repository, a customer invoice that, among other things, identifies the customer (e.g., a name or address of user 101, etc.), the local landscaping company (e.g., a name, address, or phone number of merchant 111), each of the landscaping services and products associated with the completed landscaping project, unit costs associated with each of the purchase landscaping services, and aggregates cost associated with completed landscaping project.

Figure 2A:
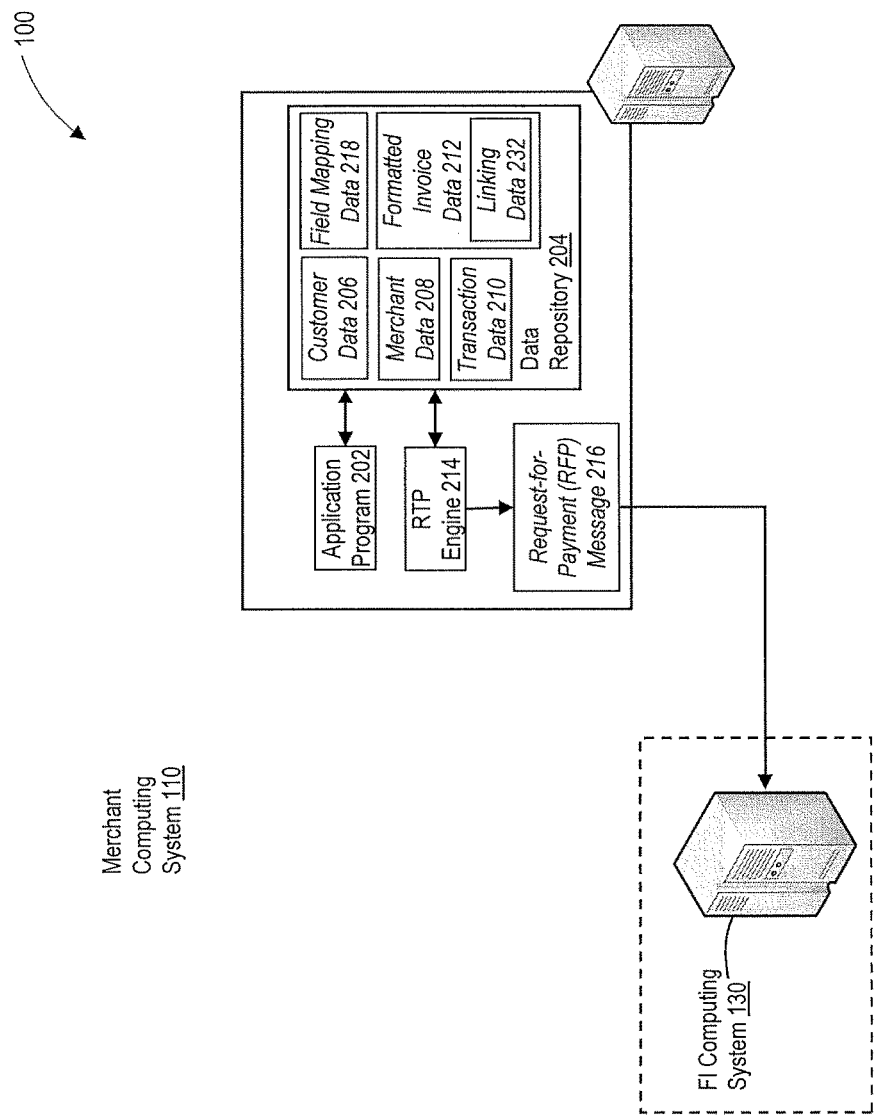
FIG. 2A is a block diagram illustrating a portion of an exemplary computing environment, in accordance with some exemplary embodiments.

Referring to FIG. 2A, and upon execution by the one or more processors of merchant computing system 110, executed application program 202 may perform operations that access a data repository 204 (e.g., as maintained within the one or more tangible, non-transitory memories of merchant computing system 110), and obtain one or more elements of customer data 206, which identify and characterize user 101, one or more elements of merchant data 208, which identify and characterize merchant 111, and one or more elements of transaction data 210, which identify and characterize each of the purchased landscaping products and services, the unit costs associated with the purchased landscaping products and services, and the aggregate costs for the completed landscaping project.

By way of example, the elements of customer data 206 may include, among other things, a unique customer identifier associated with user 101 (e.g., an alphanumeric character string assigned to user 101 by merchant computing system 110, etc.), a full name of user 101 (e.g., "John Q. Smith"), and a postal address of user 101 ("3108 N Street NW, Washington, D.C., 20007, US"). Further, in some examples, the elements of customer data 206 may also include customer account information that identifies a payment instrument held by user 101 and capable of funding the now-completed landscaping project. Examples of the payment instrument held by user 101 may include, but are not limited to, a deposit account (e.g., a checking or savings account, etc.) or a credit-card account issued to user 101 by a corresponding financial institution (e.g., the financial institution associated with FI computing system 130), and the information that identifies the payment instrument may include, but is not limited to, all or a portion of a corresponding account number (e.g., an actual or tokenized account number) and in some instances, a corresponding expiration data and/or corresponding card verification code (e.g., associated with a credit-card account), or a corresponding routing number (e.g., associated with a deposit account). Further, in some instances, user 101 may provision the customer account information to merchant 111 prior to an initiation of the landscaping project, e.g., to guarantee a purchase of one or more landscaping products associated with the landscaping project.

The elements of merchant data 208 may include, among other things, a business name of merchant 111 (e.g., "Josh's Stone and Landscape"), a business address of merchant 111 (e.g., "1234 Main Street, Falls Church, Virginia, 22046"), and contact information for merchant 111 (e.g., a telephone number, an email address, etc.). Further, in some instances, the elements of merchant data 208 may also include merchant account information that identifies a merchant account held by merchant 111 and configured to receive proceeds from one or more purchase transactions involving corresponding counterparties, such as, but not limited to, the purchase of the landscaping services and products associated with the now-completed landscaping project by user 101. For example, the merchant account held by merchant 111 may include, but is not limited to, a deposit account, such as a checking account, issued to merchant by a corresponding financial institution (e.g., the financial institution associated with FI computing system 130, an additional, unrelated financial institution, etc.). As described herein, the merchant account information may include all or a portion of a corresponding account number (e.g., an actual or tokenized account number) and/or a corresponding routing number.

Further, in some instances, the elements of transaction data 210 may include, but are not limited to, an identifier of each of the landscaping products and services associated with, and involved in, the now-completed landscaping project, and unit costs associated with corresponding ones of the landscaping products and services. By way of example, the landscaping project may include seasonal mulching and lawn care services at the home of user 101, and the elements of transaction data may include, among other things: (i) an identifier of the provisioned lawn care services and a unit cost (e.g., $250.00) for the provisioned lawn care services; (ii) an identifier of the provisioned mulching services and a unit cost for the provisioned mulching services (e.g., $350.00); and (iii) a quantity of the bags of mulch purchased to provision the mulching services (e.g., ten bags), a universal product code (UPC) or other unique identifier of the purchased bags of mulch, and a total cost associated with the purchased bags of mulch (e.g., $300.00). The elements of transaction data 210 may also include a subtotal for the landscaping products and services involved in the landscaping project (e.g., $900.00), an amount of imposed sales tax on the purchased landscaping products (e.g., $30.00), and a total cost of the now-completed landscaping project (e.g., $930.00). The elements of transaction data 210 may also, in some instances, specify a date (e.g., Oct. 1, 2021) by which merchant 111 requests a payment from user 101 in the amount of the total, $930.00 cost of the completed landscaping project.

Referring back to FIG. 2A, executed application program 202 may perform operations that process the elements of customer data 206, merchant data 208, and transaction data 201, and that generate an invoice for the now-completed landscape project that, among other things, identifies user 101 and merchant 111, a postal address of merchant 111, and/or the purchased landscaping products or services associated with the now-completed landscaping project. The generated invoice may be structured in accordance with one or more standardized document formats, such as a PDF format, an HTML format, or an XML format, and in some instances, executed application program 202 may generate one or more elements of formatted invoice data 212 that identify merchant 111 (e.g., "Josh's Stone and Landscape"), a postal address associated with merchant 111 (e.g., "1234 Main Street, Falls Church, Virginia, 22046"), user 101 (e.g., "John Q. Smith"), and the postal address of user 101 and the now-completed landscaping project ("3108 N Street NW, Washington, D.C., 20007, US").

The elements of formatted invoice data 212 may also include portions of transaction data 210 that identify the purchased landscaping products or services (e.g., the names of the lawn care and mulching services, the UPCs of the purchased bags of mulch, etc.), the unit costs of the purchased landscaping products or services (e.g., the $250.00 cost for the purchased lawn services, the $350.00 cost of the purchased mulching services, the $300.00 cost of the ten purchased bags of mulch, etc.), and the aggregate costs for the now-completed landscaping project (e.g., the $900.00 subtotal, the $30.00 in imposed taxes, and the total cost of $930.00). As illustrated in FIG. 2A, executed application program 202 may perform operations that store the elements of formatted invoice data 212, which collectively establish the invoice for now-completed landscaping project, within a corresponding portion of a tangible, non-transitory memory, such as within a portion of data repository 204.

In some examples, merchant 111 may elect to present the generated invoice to user 101 for payment, e.g., in physical form to user 101 or in digital form via one or more messages exchanged between merchant computing system 110 and client device 102). User 101 may, for example, provision information associated with the requested payment, including an account number and/or a bank routing number associated with a corresponding payment instrument to merchant 111 (e.g., via merchant computing system 110), and merchant computing system 110 may perform operations that broadcast data characterizing the transaction and the payment across network 120 to one or more computing systems associated with a transaction-processing network or payment rail, e.g., for clearance and settlement using one or more conventional payment clearance and settlement protocols.

In other instances, one or more application programs executed by merchant computing system 110, such as RTP engine 214 of FIG. 2A, may perform any of the exemplary RTP processes described herein, which, in conjunction with one or more computing systems operating within environment 100 (such as, but not limited to, FI computing system 130), enable merchant 111 to request, and to receive, a payment for the purchased landscaping products and services in real-time and contemporaneously with the completion of the landscaping project. By way of example, upon execution by the one or more processors of merchant computing system 110, executed RTP engine 214 may perform operations that access data repository 204, and obtain one or more of the elements of customer data 206, merchant data 208, and transaction data 210 maintained locally within data repository 204. Based on portions of the obtained elements of customer data 206, merchant data 208, and transaction data 210, executed RTP engine 214 may perform any of the exemplary processes described herein to generate a request-for-payment (RFP) message 216 that is structured and formatted in accordance with the one or more elements of field mapping data 218 and that requests a payment from user 101 for the purchased landscaping services and products (e.g., the total cost of $930.00) in real-time and contemporaneously with the completion of the landscaping project at the home of user 101. As described herein, RFP message 216 may be structured in accordance with the ISO 20022 standard for electronic data exchange between financial institutions, and in some examples, RFP message 216 may correspond to a pain.013 message as specified within the ISO 20022 standard. Further, and as described herein, the one or more elements of field mapping data 218 may characterize a structure, composition, or format of one or more data fields of ISO-20002-compliant RFP message 216 (e.g., the one or more data fields within the pain.013 message).

By way of example, ISO-20022-compliant RFP message 216 may include, among other things: (i) message fields populated with data specifying a customer name and postal address of user 101; (ii) message fields populated with data identifying the payment instrument held by user 101 and capable of funding the requested payment (iii) message fields populated with data specifying a merchant name and postal address of merchant 111; (iv) message fields populated with data identifying the merchant account held by merchant 111 and available to receive proceeds from the requested payment; and (v) message fields populated with one or more parameter values that characterize the purchase of the landscaping services and products, a requested payment method, and/or a requested payment date. Further, ISO-20022-compliant RFP message 216 may also include one or more structured or unstructured message fields that specify additional information associated with the initiated purchase transaction.

Examples of the additional information include, but are not limited to, information identifying the purchased landscaping services or products involved in the landscaping project and/or a link to remittance data associated with the initiated transaction (e.g., a link to a PDF or HTML invoice for the now-completed landscape project). In some instances, as described herein, the link may include a long-form uniform resource locator (URL) into which certain of the elements of customer data 206, merchant data 208, or transaction data 210 may be embedded, such as, but not limited to, the postal code of merchant 111 or the unique customer identifier associated with user 101. In other instances, the link may include a shortened URL, such as a tiny URL, actionable by FI computing system 130 using any of the exemplary processes described herein.

In some instances, executed RTP engine 214 may parse the elements of customer data 206, merchant data 208, and transaction data 210, and may perform that populate the message fields of RFP message 216 with corresponding ones of the elements of customer data 206, merchant data 208, and transaction data 210 in accordance with field mapping data 218. For example, executed RTP engine 214 may parse the elements of formatted invoice data 212 and obtain the requested payment date (e.g., Oct. 1, 2021), a requested payment amount (e.g., the U.S. $930.00 total cost of the landscaping project), and additionally, or alternatively, a currency associated with that requested payment amount (e.g., U.S. dollars). Executed RTP engine 214 may also format the requested payment date, the requested payment amount, and the requested payment currency in accordance with portions of field mapping data 218. As illustrated in FIG. 2B, executed RTP engine 214 may perform operations that populate message field 220 of RFP message 216 with the formatted payment date (e.g., "2021-10-01") and message fields 222 of RFP message 216 with respective ones of the formatted payment amount (e.g., "930.00") and formatted payment currency (e.g., "USD").

Executed RTP engine 214 may further parse the elements of customer data 206 to obtain the customer name (e.g., "John Q. Smith") of user 101 and the postal address (e.g., "3108 N Street NW, Washington, D.C., 20007, U.S.") associated with user 101. Additionally, in some instances, executed RTP engine 214 may also parse the elements of customer data 206 to obtain customer account information that identifies the payment instrument capable of funding the aggregate costs of the landscaping project, such as, but not limited to, all or a portion of a tokenized or actual account number (e.g., "XXXX-1234-5678-9012") and/or a bank routing number (e.g., "123456789"). In some instances, executed RTP engine 214 may format the obtained customer name, the obtained customer address, additionally, or alternatively, portions of the customer account information in accordance with portions of field mapping data 218. For example, as illustrated in FIG. 2B, executed RTP engine 214 may perform operations that populate message fields 224 of RFP message 216 with respective portions of the formatted customer name and customer address, and that populate message field 226 with the portions of the tokenized account number of the payment instrument.

Executed RTP engine 214 may also parse the elements of merchant data 208 to obtain the merchant name (e.g., "Josh's Stone and Landscaping") of merchant 111, the postal address (e.g., "1234 Main Street, Falls Church, Virginia, 22046, U.S.") associated with merchant 111, and merchant account information that identifies merchant account held by merchant 111 and capable of receiving proceeds from the requested payment. As described herein, examples of the merchant account information include, but are not limited to, all or a portion of a tokenized or actual account number (e.g., "XXXX-9012-3456-7890") and/or a bank routing number (e.g., "987564231"). In some instances, executed RTP engine 214 may format the obtained merchant name, the obtained merchant address, and portions of the merchant account information in accordance with portions of field mapping data 218, and as illustrated in FIG. 2B, executed RTP engine 214 may perform operations that populate message fields 228 of RFP message 216 with respective portions of the formatted merchant name and merchant address, and that populate message field 230 with the formatted portions of the merchant account information.

Further, and as described herein, RFP message 216 may also include one or more message fields that specify remittance information associated with requested payment, such as, but not limited to, a link to the PDF or HTML invoice for the landscaping products and services involved in the now-completed landscaping project. By way of example, executed RTP engine 214 may access the one or more elements of formatted invoice data 212 maintained within data repository 204, and may perform operations that generate corresponding elements of linking data 232 that include, among other things, a long-form or shortened URL associated with the stored elements of formatted invoice data 212 (e.g., that point to the storage location of formatted invoice data 212 within data repository 204).

In some instances, executed RTP engine 214 may perform operations that obtain linking data 232 from data repository 204, and that process and package all, or a selected portion, of linking data 232 within a corresponding unstructured message field of RFP message 216. For example, linking data 232 may include a long-form URL (e.g., http://www.J-StoneLandscaping.com/receipt?custid='1234'?zip='20007') that points to formatted invoice data 212 maintained within data repository 204 and includes the actual postal code (e.g., "20007") of user 101 and a customer identifier of user 101 (e.g., "1234"). As illustrated in FIG. 2B, executed RTP engine 214 may parse linking data 232, obtain the long-form URL, and package the long-form URL into an unstructured message field 234 of RFP message 216. The disclosed embodiments are, however, not limited to RFP messages populated with these exemplary elements of customer, merchant, payment, transaction, and additional remittance data, and in other examples, RFP message 216 may include any additional, or alternate, message fields specified within field mapping data 218 and consistent with the ISO 20022 standard for electronic data exchange, and executed RTP engine 214 may populate these message fields with any additional, or alternate, structured and formatted elements of customer, merchant, payment, transaction, or additional remittance data appropriate to RFP message 216 and field mapping data 218.

Referring back to FIG. 2A, executed RTP engine 214 may perform operations that cause merchant computing system 110 to broadcast now-populated RFP message 216 across network 120 to FI computing system 130, either directly or via one or more intermediate computing systems 236. By way of example, the one or more intermediate computing systems 236 may include, but are not limited to, a computing system associated with the financial institution of merchant 111 (e.g., that issued the merchant account to merchant 111) and one or more computing systems of a clearinghouse associated with the RTP ecosystem. In some instances, prior to broadcasting now-populated RFP message 216 across network 120, executed RTP engine 214 may perform operations that encrypt RFP message 216 using an encryption key, and examples of the encryption key include, but are not limited to, a public cryptographic key associated with FI computing system 130.

In some examples, the operations performed by executed RTP engine 214 may cause merchant computing system 110 to transmit RFP message 216 across network 120 to the computing system associated with the financial institution of merchant 111, which may perform operations that, among other things, determine merchant 111 is permitted to request real-time payment using the exemplary RTP processes described herein, and based on the determination, route RFP message 216 to the one or more computing systems of the clearinghouse. In other examples, the operations performed by executed RTP engine 214 may cause merchant computing system 110 to transmit RFP message 216 across network 120 directly to the one or more computing systems associated with the clearinghouse. The one or more computing systems of the clearinghouse may, for example, perform operations that validate a structure or a composition of RFP message, and based on the validation of the structure or composition of RFP message 216, that obtain a network address of FI computing system 130 (e.g., based on a portion of the information maintained within message field 226), and that route validated RFP message 216 across network 120 to FI computing system 130, which may perform any of the exemplary RTP processes described herein to not only enable merchant 111 to request, and receive confirmation of, a payment for the purchased landscaping products and services in real-time and contemporaneously with the completion of the landscaping project, but also to obtain, and aggregate, and disseminate, verified reviews of the merchant 111 and the now-completed landscaping project that are associated with, and linked to, the purchased landscaping products and services.

Figure 3A:
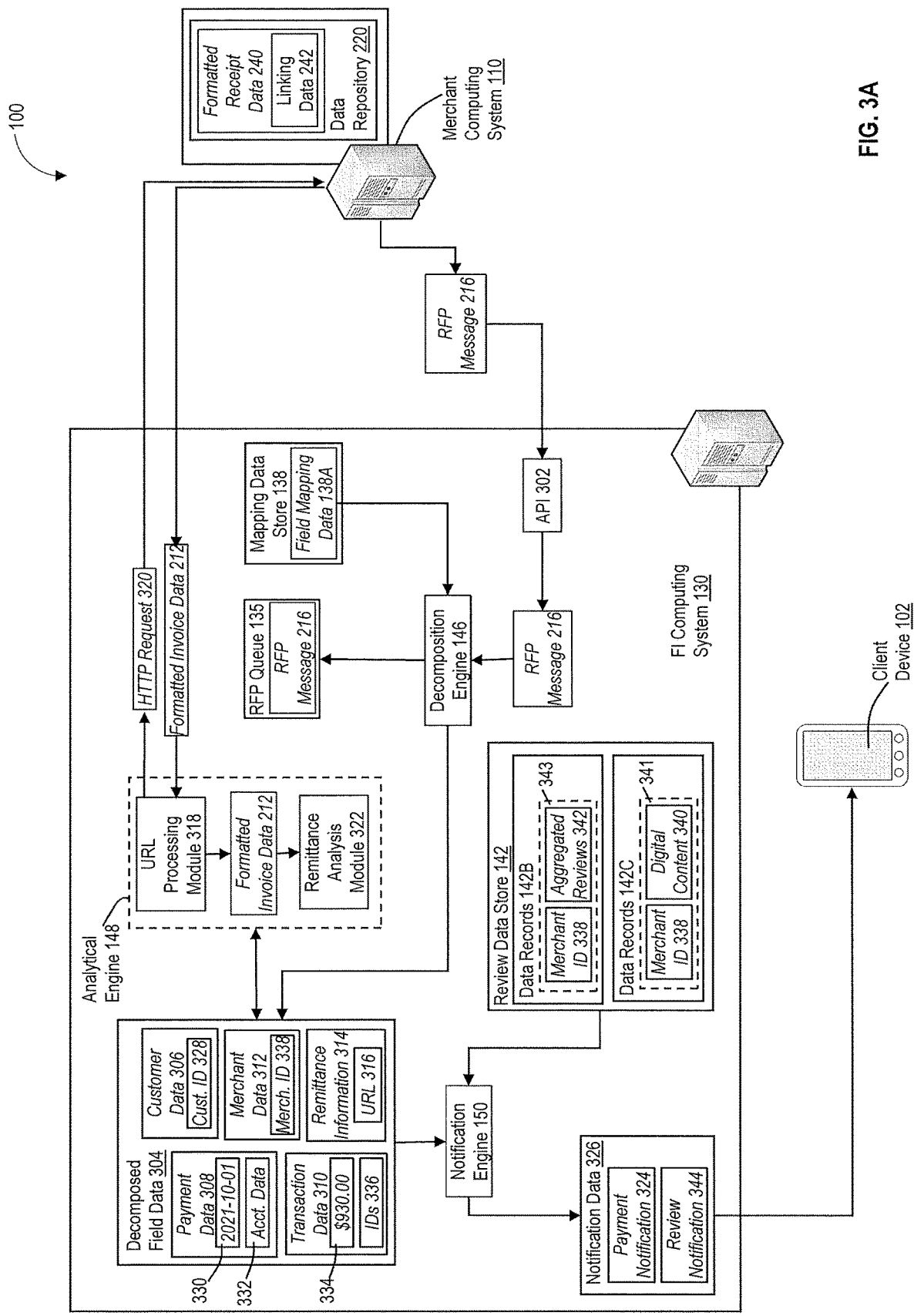
FIGS. 3A, 3B, 3C, 4A, and 4B, are block diagrams illustrating portions of an exemplary computing environment, in accordance with some exemplary embodiments.

Referring to FIG. 3A, a programmatic interface established and maintained by FI computing system 130, such as application programming interface (API) 302, may receive RFP message 216, and may route RFP message 216 to decomposition engine 146, which may be executed by the one or more processors of FI computing system 130. As described herein, FI computing system 130 may receive RFP message 216 directly across network 120 via a channel of communications established programmatically between API 302 and executed RTP engine 214 of merchant computing system 110. In other instances, FI computing system 130 may receive RFP message 216 across network 120 from one or more of intermediate computing systems 236, such as, but not limited to, the one or more computing systems associated with the clearinghouse. Further, and as described herein, one or more portions of RFP message 216 may be encrypted (e.g., using a public cryptographic key associated with FI computing system 130), and executed decomposition engine 146 may perform operations that access a decryption key maintaining within the one or more tangible, non-transitory memories of FI computing system 130 (e.g., a private cryptographic key associated with FI computing system 130), and that decrypt the encrypted portions of RFP message 216 using the decryption key.

In some cases, executed decomposition engine 146 may store RFP message 216 (in decrypted form) within a corresponding portion of data repository 134, e.g., within RFP message queue 136. Executed decomposition engine 146 may also perform operations that access mapping data store 138 (e.g., as maintained within data repository 134), and obtain one or more elements of field mapping data 138A that characterize a structure, composition, or format of one or more data fields of RFP message 216. For example, and as described herein, RFP message 216 may include message fields consistent with the ISO 20022 standard for electronic data exchange between financial institutions, and each of the message fields may be populated with data structured and formatted in accordance with the ISO 20022 standard.

As described herein, RFP message 216 may be associated with a real-time payment of $930.00 requested from user 101 by merchant 111 for the landscaping products and services involved in the landscaping project completed on Sep. 30, 2021. By way of example, RFP message 216 may include, but is not limited to, a message field populated with data specifying the requested payment date of October $1^{st}$ (e.g., message field 220 of FIG. 2B) and message fields populated within data specifying the requested payment amount of US $930.00 (e.g., message fields 222 of FIG. 2B). RFP message 216 may also include, but is not limited to, message fields populated with data that identify and characterize user 101 (e.g., message fields 224 of FIG. 2B) and merchant 111 (e.g., message fields 228 of FIG. 2B). In some instances, RFP message 216 may also include message fields populated with data that identifies the payment instrument held by user 101 and capable of funding the requested payment (e.g., message field 226 of FIG. 2B) and additionally, or alternatively, message fields populated with data that identifies the merchant account capable of receiving funds derived from the requested payment (e.g., message field 230 of FIG. 2B).

Further, and as described herein, RFP message 216 may include one or more additional data fields populated with structured or unstructured remittance data, such as, but not limited to, a long-form URL that points to formatted invoice data 212 maintained within data repository 204 (e.g., message field 234 of FIG. 2B, which may include http://www.JStoneLandscaping.com/receipt?custid='1234'?zip='20007'). The disclosed examples are, however, not limited to structured or unstructured remittance data that includes a long-form URL, and examples are contemplated in which the structured or unstructured remittance data may include one or more identifiers (e.g., UPCs, etc.) of the purchased landscaping products or services, or a shortened URL that points to formatted invoice data 212.

Based on the obtained elements of field mapping data 138A, executed decomposition engine 146 may perform operations that parse RFP message 216 and obtain elements of decomposed field data 304 that identify and characterize user 101, merchant 111, and the requested payment for the landscaping project completed on Sep. 30, 2021. In some instances, through the performance of one or more of these exemplary processes, executed decomposition engine 146 may "decompose" the structured or unstructured data populating the message fields of RFP message 216 in accordance with field mapping data 138A, and generate the elements of decomposed field data 304 that include, but are not limited to, elements of customer data 306, payment data 308, transaction data 310, and merchant data 312. Executed decomposition engine 146 may also perform operations that store the elements of decomposed field data 304, including the elements of customer data 306, payment data 308, transaction data 310, and merchant data 312, within a corresponding portion of a tangible, non-transitory memory accessible to merchant computing system 110, e.g., within data repository 134 (not illustrated in FIG. 3A).

By way of example, and based on the elements of field mapping data 138A, executed decomposition engine 146 may determine that message fields 224 of RFP message 216 include data that identifies and characterizes user 101, and may perform operations that obtain, from message fields 224, a customer name of user 101 (e.g., "John Q. Smith") and a customer address of user 101 (e.g., "3108 N Street NW, Washington, D.C., 20007, U.S."). As illustrated in FIG. 3A, executed decomposition engine 146 may package the obtained customer name and postal address into corresponding portions of customer data 306. Further, based on the elements of field mapping data 138A, executed decomposition engine 146 may determine that message fields 220 and 226 of RFP message 216 include data identifying respective ones of the requested payment date and the payment instrument held by user 101 and capable of funding the requested payment. In some instances, executed decomposition engine 146 may perform operations that obtain, from respective ones of message fields from message fields 220 and 226, the requested payment date of Oct. 1, 2021, and the information that identifies the payment instrument (e.g., the account number "XXXX-1234-5678-9012"), which executed decomposition engine 146 may package into corresponding portions of payment data 308.

Executed decomposition engine 146 may also determine, based on the elements of field mapping data 138A, that message fields 222 of RFP message 216 include data identifying the requested payment amount and the currency associated with that requested payment amount, and may perform operations that obtain, from respective ones of message fields 230, data that identifies the $930.00 requested payment amount and the requested denomination in U.S. currency. Executed decomposition engine 146 may also package the obtained data within corresponding portions of transaction data 310. Further, and based on the elements of field mapping data 138A, executed decomposition engine 146 may determine that message fields 228 and 230 are populated with data that identifies and characterizes merchant 111 and the merchant account configured to receive the funds derived from the requested payment. Executed decomposition engine 146 may perform operations that obtain, from message fields 228, the merchant name of merchant 111 (e.g., "Josh's Stone and Landscaping") and a postal address associated with merchant 111 (e.g., "1234 Main Street, Falls Church, Virginia, 22046, U.S."), and that obtain the data identifying the merchant account from message field 230 (e.g., the account number "XXXX-9012-3456-7890" of the merchant account). Further, executed decomposition engine 146 may perform additional operations that package the obtained merchant name, the obtained merchant address, and the obtained data identifying the merchant account into corresponding portions of merchant data 312.

Additionally, and as described herein, executed decomposition engine 146 may also determine, based on the elements of field mapping data 138A, that message field 234 of RFP message 216 includes structured or unstructured elements of remittance data that characterizes further user 101, merchant 111, of the purchased landscaping products or services associated with the requested, real-time payment. In some instances, executed decomposition engine 146 may obtain the structured or unstructured elements remittance data from message field 234 and package the obtained elements of remittance data into corresponding portions of remittance information 314. For example, the elements of structured or unstructured remittance data may include the long-form URL that points to formatted invoice data 212 maintained within data repository 204, and executed decomposition engine 146 may obtain the long-form URL from message field 234 of RFP message 216, and package that long-form URL into remittance information 314, e.g., as URL 316.

As described herein, the elements of formatted invoice data 212 maintained by merchant computing system 110 may be structured in accordance with one or more standardized document formats, such as a PDF or an HTML format, and may identify user 101 (e.g., the customer name and postal address, etc.) and merchant 111 (e.g., the merchant name, postal address, telephone number, etc.). Further, and as described herein, the elements of formatted invoice data 212 may also include information identify the now-completed landscaping project (e.g., a project name, the September 30$^{th}$ completion date, etc.), along with additional information that identifies the purchased landscaping products or services associated with the requested payment (e.g., the names of the lawn care and mulching services, the UPCs of the purchased bags of mulch, etc.), the unit costs of the purchased landscaping products or services (e.g., the $250.00 cost for the purchased lawn services, the $350.00 cost of the purchased mulching services, the $300.00 cost of the ten purchased bags of mulch, etc.), and the aggregate costs for the now-completed landscaping project (e.g., the $900.00 subtotal, the $30.00 in imposed taxes, and the total cost of $930.00).

In some instances, the one or more processors of FI computing system 130 may execute analytical engine 148, which may perform operations that, based on URL 316 maintained within remittance information 314 of decomposed field data 304, programmatically access the elements of formatted invoice data 212 maintained at merchant computing system 110, and that process the accessed elements of formatted invoice data 212 to obtain additional, or alternate, elements of customer data 306, payment data 308, transaction data 310, or merchant data 312. For example, a URL processing module 318 of executed analytical engine 148 may access URL 316 maintained within remittance information 314 (e.g., the long-firm URL described herein, a shortened URL, etc.), and may process URL 316 and generate a corresponding HTTP request 320 for the elements of formatted invoice data 212 maintained at merchant computing system 110. Executed URL processing module 318 may also perform operations that cause FI computing system 130 to transmit HTTP request 320 across network 120 to merchant computing system 110.

Merchant computing system 110 may, for example, receive HTTP request 320, and based on portions of HTTP request 320 and linking data 232 (e.g., based on a determined match or correspondence between the portions of HTTP request 320 and linking data 232), merchant computing system 110 may perform operations that obtain the elements of formatted invoice data 212 from data repository 204, and that transmit the elements of formatted invoice data 212 across network 120 to FI computing system 130, e.g., as a response to HTTP request 320. Further, as illustrated in FIG. 3A, executed URL processing module 318 may receive the elements of formatted invoice data 212 from merchant computing system 110, and may route the elements of formatted invoice data 212 to a remittance analysis module 322 of executed analytical engine 148.

Upon execution by the one or more processors of FI computing system 130, executed remittance analysis module 322 may perform any of the exemplary processes described herein to parse the elements of formatted invoice data 212 (e.g., in a received format, such as a PDF or HTML form, or in a transformed or enhanced format, etc.) and obtain, from the parsed elements of formatted invoice data 212, one or more of the additional, or alternate, elements of customer data 306, payment data 308, transaction data 310, or merchant data 312. By way of example, executed remittance analysis module 322 may apply one or more optical character recognition (OCR) processes or optical word recognition (OWR) processes to the elements of formatted invoice data 212 in PDF form to generate, or obtain, elements of textual content representative of the data that characterize user 101, merchant 111, the requested payment, the landscaping project, or the purchased landscaping products and services.

By way of example, executed remittance analysis module 322 may perform operations that detect a presence one or more keywords within the generated elements of textual content (e.g., "subtotal," "project," "completion date," etc.), and may extract elements of the textual content associated with these keywords as corresponding ones of the additional, or alternate, elements of customer data 306, payment data 308, transaction data 310, or merchant data 312. In other examples, executed remittance analysis module 322 may detect a presence of the additional, or alternate, elements of customer data 306, payment data 308, transaction data 310, or merchant data 312 within the generated textual content based on an application of one or more adaptively trained machine learning or artificial intelligence models to portions of the textual content, and examples of these adaptively trained machine learning or artificial intelligence models includes a trained neural network process (e.g., a convolutional neural network, etc.) or a decision-tree process that ingests input datasets composed of all, or selected portions, of the textual content.

In some examples, the elements of formatted invoice data 212 may be structured in accordance with a document template, and executed remittance analysis module 322 may perform operations that identify the additional, or alternate, elements of customer data 306, payment data 308, transaction data 310, or merchant data 312 within the textual content, and that extract the additional, or alternate, elements of customer data 306, payment data 308, transaction data 310, or merchant data 312 from the textual content, based on information that characterizes the structure specified by the document template. The disclosed embodiments are, however, not limited to exemplary processes for detecting and extracting one or more of the additional, or alternate, elements of customer data 306, payment data 308, transaction data 310, or merchant data 312 from the generated textual content, and in other instances, executed remittance analysis module 322 may perform any additional, or alternate, process for identifying one or more of the additional, or alternate, elements of customer data 306, payment data 308, transaction data 310, or merchant data 312 within the textual content derived from the processing of the elements of formatted invoice data 212 in PDF format.

Further, and as described herein, the elements of formatted invoice data 212 may be structured in HTML form, and may include metadata that identify and characterize user 101 (e.g., the customer name or postal address, etc.), merchant 111 (e.g., the merchant name or postal address, etc.), the requested payment, the landscaping project (e.g., the project name or completion date, etc.), or the purchased landscaping products and services (e.g., names of the purchased landscaping services, UPCs of the purchased bags of mulch, unit costs for the purchased landscaping products and services, etc.). Executed remittance analysis module 322 may perform operations that detect one or more of the elements of metadata within the elements of formatted invoice data 212, and that obtain, from the elements of metadata, one or more of the additional, or alternate, elements of customer data 306, payment data 308, transaction data 310, or merchant data 312. The disclosed embodiments are, however, not limited to these exemplary processes for detecting and extracting the additional, or alternate, elements of customer data 306, payment data 308, transaction data 310, or merchant data 312 from HTML-formatted receipt data, and in other instances, executed remittance analysis module 322 may perform any additional, or alternate, process detecting and obtaining data from the elements of formatted invoice data 212 structured in HTML form, including, but not limited to, an application of one or more screen-scraping processes to portions of formatted invoice data 212 structured in HTML form.

As described herein, the elements of formatted invoice data 212 may include, among other things, information characterizing the completed landscaping project (e.g., a project name, the August $30^{th}$ completion date, etc.), identifiers of the purchased landscaping products or services (e.g., the names of the lawn care and mulching services, the UPCs of the purchased bags of mulch, etc.), the unit costs of the purchased landscaping products or services (e.g., the $250.00 cost for the purchased lawn services, the $350.00 cost of the purchased mulching services, the $300.00 cost of the ten purchased bags of mulch, etc.), and the aggregate costs for the now-completed landscaping project (e.g., the $900.00 subtotal, the $30.00 in imposed taxes, and the total cost of $930.00). By way of example, and through an implementation of any of the exemplary processes described herein, executed remittance analysis module 322 may obtain, from the processed elements of formatted invoice data 212, project information that identifies the completed landscaping project and the completion date of Sep. 30, 2021, and one or more identifiers of the purchased landscaping products and services (e.g., the names of the purchased mulching and lawn care services, and the UPCs of the purchased bags of mulch), and may store the project information and the identifiers within a portion of decomposed field data 304, e.g., within a portion of transaction data 310 (not illustrated in FIG. 3A).

The disclosed embodiments are, however, not limited to processes that obtain information characterizing the completed landscaping project and identifiers of the purchased landscaping services and products from the processed elements of formatted invoice data 212. In other instances, executed remittance analysis module 322 perform any of the exemplary processes described herein to extract or obtain any additional, or alternate, information that identifies or characterizes user 101, merchant 111, the requested payment, the landscaping project, or the purchased landscaping products and services from the processed elements of formatted invoice data 212, and to store the portions of the additional, or alternate, information within corresponding portions of customer data 306, payment data 308, transaction data 310, and/or merchant data 312.

Referring back to FIG. 3A, and upon execution by the one or more processors of FI computing system 130, notification engine 150 may perform operations that access data repository 134, and obtain decomposed field data 304 that includes one or more elements of customer data 306, payment data 308, transaction data 310, merchant data 312, and remittance information 314, e.g., as extracted from the structured or unstructured message fields of RFP message 216. As described herein, the one or more elements of customer data 306, payment data 308, transaction data 310, merchant data 312, and remittance information 314 may collectively identify and characterize the $930.00 payment requested from merchant 111 (e.g., Josh's Stone and Landscape) for the landscaping project completed on Sep. 30, 2021, which includes the $250.00 cost for the purchased lawn services, the $350.00 cost of the purchased mulching services, the $300.00 cost of the ten purchased bags of mulch, and the $30.00 in imposed sales taxes. In some instances, based on portions of decomposed field data 304, executed notification engine 150 may perform operations that generate a payment notification 324 associated with the requested $930.00 payment, and that generate notification data 326 that includes, among other things, payment notification 324.

By way of example, executed notification engine 150 may perform operations that parse customer data 306 within decomposed field data 304 and obtain a customer identifier 328, such as, but not limited, a full name of user 101 extracted from message fields 224 of RFP message 216 (e.g., "John Q. Smith"). Executed notification engine 150 may also perform operations that parse payment data 308, and obtain, among other things, a payment date 330 associated with the requested $930.00 payment (e.g., Oct. 1, 2021) and account data 332 that identifies the payment instrument held by user 101 and capable of funding the requested $930.00 payment (e.g., the account number "XXXX-1234-5678-9012" and/or the bank routing number "123456789," etc.). Further, in some examples, executed notification engine 150 may parse transaction data 310 to obtain a payment amount 334 of the requested $930.00 payment (e.g., $930.00), and one or more identifiers 336 of the now-completed landscaping project (e.g., a project name, etc.) and the purchased landscaping products or services associated with requested $930.00 payment (e.g., the names of the lawn care and mulching services, the UPCs of the purchased bags of mulch, etc.).

Executed notification engine 150 may also perform operations that parse merchant data 312 to obtain a merchant identifier 338 of merchant 111, and examples of merchant identifier 338 include, but are not limited to the merchant name (e.g., "Josh's Stone and Landscaping") or a unique, alphanumeric identifier assigned to merchant 111 by FI computing system 130. The disclosed embodiments are, however, not limited to these exemplary elements of data that identify and characterize the requested $930.00 payment, and in other examples, executed notification engine 150 may perform operations that parse one or more of customer data 306, payment data 308, transaction data 310, merchant data 312, and remittance information 314 and obtain any additional, or alternate, elements of data that identify and characterize the requested $930.00 payment, such as, but not limited to, the unit costs of the purchased landscaping products or services (e.g., the US $250.00 cost for the purchased lawn services, the US $350.00 cost of the purchased mulching services, the US $300.00 cost of the ten purchased bags of mulch, etc.), an address of merchant 111, or one or more of the aggregate costs for the now-completed landscaping project (e.g., the US $900.00 subtotal, the US $30.00 in imposed taxes, and the total cost of US $930.00, etc.).

As illustrated in FIG. 3A, executed notification engine 150 may perform operations that package all, or selected portion of, customer identifier 328, payment date 330, account data 332, payment amount 334, identifiers 336, and/or merchant identifier 338 into corresponding portions of payment notification 324, which may be incorporated within notification data 326. In some instances, not illustrated in FIG. 3A, executed notification engine 150 may also perform operations that package, into an additional portion of payment notification 324, elements of layout data that specifies a disposition of, or a visual characteristic of, one or more interface elements that establish a graphical representation of payment notification 324 associated with the requested $930.00 payment, e.g., when presented on a digital interface by an application program executed by client device 102, such as mobile banking application 108 described herein. Further, executed notification engine 150 may perform any of the exemplary processes described herein to identify one or more elements of digital content that, when packaged into a corresponding portion of payment notification 324 or notification data 326, and when presented on the digital interface by executed mobile banking application 108, prompt user 101 to provide input to client device 102 that specifies one or more counterparty-, product-, or service-specific reviews of the now-completed landscaping project. In some instances, and as described herein, each of the provisioned counterparty-, product-, or service-specific reviews of merchant 111 may correspond to a verified review of merchant 111 that is linked to, and associated with, an approval of the requested, real-time payment of $930.00 by user 101 and as such, that is linked to, and associated with, an actual, verified purchase of the landscaping products and services from merchant 111, and an actual, approved real-time payment funding the verified purchase.

By way of example, executed notification engine 150 may perform operations that access data records 142C of review data store 142, and that obtain one or more elements of digital content 340 that, when rendered for presentation on a digital interface by an application program executed by client device 102 (e.g. mobile banking application 108 described herein), prompt user 101 to provide input to client device 102 that specifies one or more counterparty-, product-, or service-specific reviews (e.g., one or more numerical ratings) that characterize the now-completed landscaping project. As described herein, the obtain elements of digital content 340 may be associated with, or specific to, merchant 111, and a corresponding one of data records 142C may maintain the elements of digital content 340 in conjunction with, or in association with, merchant identifier 338. In some instances, illustrated in FIG. 3A, executed notification engine 150 may parse the structured or unstructured data records of data records 142C, and identify a data record 341 that includes merchant identifier 338 of merchant 111, and obtain the elements of digital content 340 from data record 341. Executed notification engine 150 may perform operations that package merchant identifier 338 and the obtained elements of digital content 340 into corresponding portions of a review notification 344, either alone or in conjunction with one or more of customer identifier 328, payment date 330, account data 332, payment amount 334, or identifiers 336 (and further, along with one or more elements of corresponding layout data, as described herein).

Further, and as described herein, the obtained elements of digital content 340 may, when rendered for presentation rendered for presentation on the digital interface by executed mobile banking application 108, provision to user 101 a graphical representation of one or more aggregated values of customer reviews that characterize merchant 111, similar landscaping projects completed by merchant 111, or similar landscaping services or products provisioned by merchant 111. In some instances, and to facilitate a provisioning of the one or more aggregated values of customer reviews, executed notification engine 150 may perform operations that parse the structured or unstructured data records of data records 142B, and identify a corresponding data record 343 that includes merchant identifier 338 of merchant 111, and obtain elements of aggregated review data 342 associated with merchant 111 from data record 343. The obtained elements of aggregated review data 342 may, for example, include an average value of a plurality of discrete, verified customer reviews of merchant 111 received and aggregated by FI computing system 130 across one or more temporal intervals, such as, but not limited to, a prior calendar week, a prior calendar month, a prior calendar year, or any other appropriate temporal interval (e.g., using any of the exemplary processes described herein). Additionally, or alternatively, the obtained elements of aggregated review data 342 may, for example, include an average value of a plurality of discrete, verified customer reviews of one or more products or services provisioned by merchant 111, such as the landscaping, lawn care, and mulching services described herein, merchant 111 received and aggregated by FI computing system 130 across the one or more temporal intervals.

In some instances, executed notification engine 150 may perform operations that package the obtained elements of aggregated review data 342 into a corresponding portion of review notification 344, e.g., in conjunction with merchant identifier 338 and the obtained elements of digital content 340. Further, executed notification engine 150 may also package review notification 344 into a corresponding portion of notification data 326, and may perform additional operations that cause FI computing system 130 to transmit notification data 326 across network 120 to client device 102.

Figure 3B:
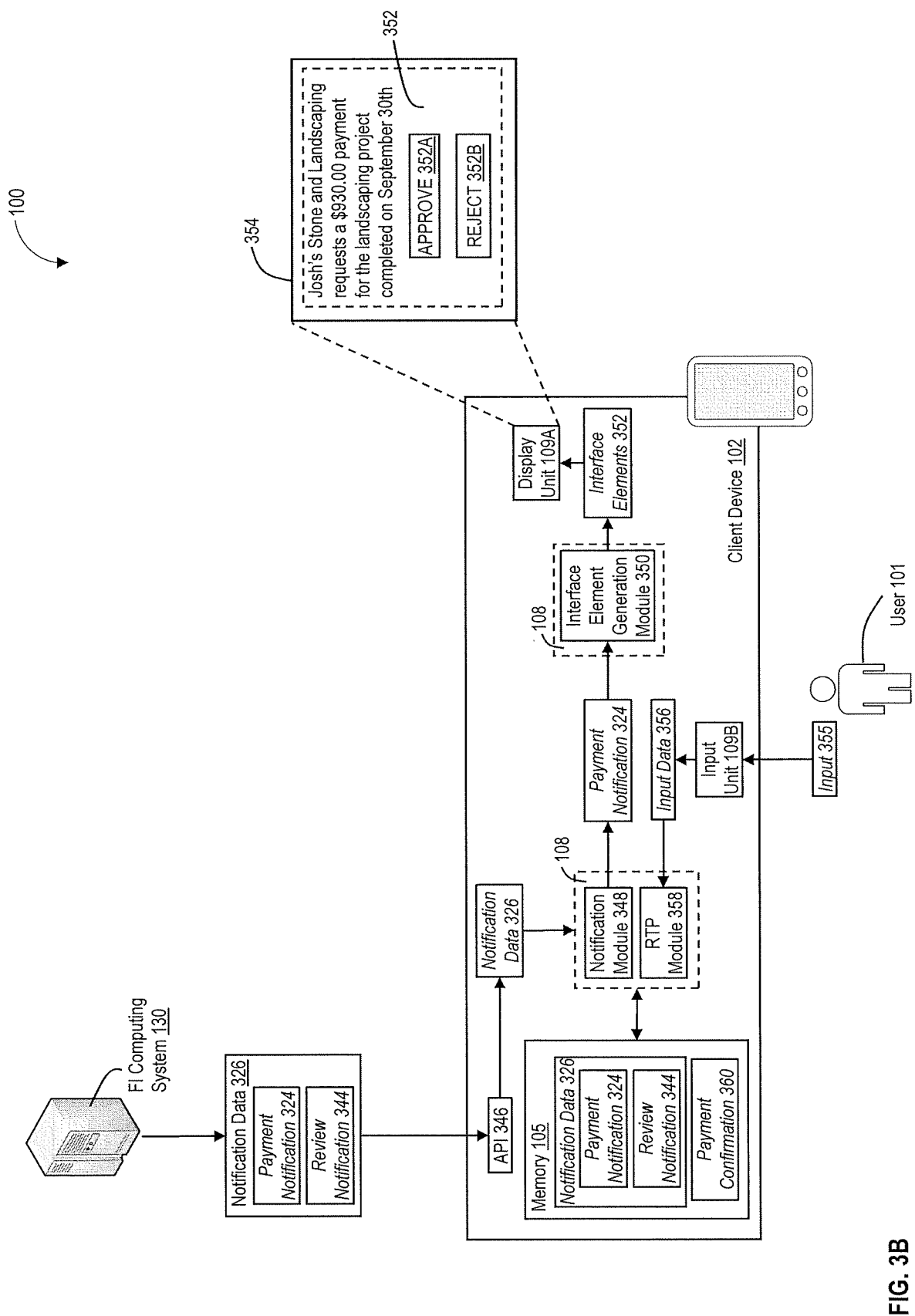

Referring to FIG. 3B, a programmatic interface associated with one or more application programs executed at client device 102, such as an application programming interface (API) 346 associated with mobile banking application 108, may receive notification data 326 and perform operations that cause client device 102 to execute mobile banking application 108 (e.g., through a generation of a programmatic command, etc.). Upon execution by the one or more processors of client device 102, executed mobile banking application 108 may receive notification data 326 from API 346, and executed mobile banking application 108 may perform operations that store notification data 326, which includes payment notification 324 and review notification 344, within a corresponding portion of a tangible, non-transitory memory, e.g., within a portion of memory 105.

Further, and by way of example, a notification module 348 of executed mobile banking application 108 may parse notification data 326 (e.g., as maintained within memory 105) and obtain payment notification 324, which includes customer identifier 328, payment date 330, account data 332, payment amount 334, identifiers 336, and/or merchant identifier 338 that characterize the $930.00 payment requested by merchant 111 from user 101 on Oct. 1, 2021, for the now-completed landscaping project. Executed notification module 348 may provide payment notification 324 as an input to an interface element generation module 350 of executed mobile banking application 108, and executed interface element generation module 350 may perform operations that generate and route interface elements 352 to display unit 109A. In some instances, when rendered for presentation within a corresponding notification interface 354 by display unit 109A, interface elements 352 provide a graphical representation of payment notification 324 to user 101 within a single display screen or window, or across multiple display screens or windows, of notification interface 354 (e.g., in accordance with the one or more elements of layout data, as described herein). As illustrated in FIG. 3B, when presented within notification interface 354, the graphical representation of payment notification 324 may prompt user 101 to approve or reject the $930.00 payment requested by Josh's Stone and Landscape for the landscaping project completed on Sep. 30, 2021, e.g., based on additional input provided to input unit 109B of client device 102 that selects a respective one of an "APPROVE" icon 352A and a "REJECT" icon 352B presented within notification interface 354.

In some instances, not illustrated in FIG. 3B, user 101 may elect to reject the $930.00 real-time payment requested by merchant 111 for the now-completed landscaping project, and user 101 may provide input to client device 102 (e.g., via input unit 109B) that selects "REJECT" icon 352B. Based on the input, executed mobile banking application 108 may perform operations (not illustrated in FIG. 3B), that generate and transmit a response that confirmation of the rejected payment across network 120 to FI computing system 130, FI computing system 130 may perform operations that delete RFP message 216 from RFP message queue 136, and generate and transmit one or more additional, ISO-20022-compliant messages to merchant computing system 110 indicative of the rejected payment, either directly across network 120 or through one or more of the computing systems of the clearinghouse and/or the financial institution of merchant 111. Based on the indication of the rejection of the requested, real-time payment by user 101, merchant computing system 110 may perform operations that enable merchant 111 to obtain payment from user 101 for the now-completed landscape project through conventional payment rails and payment processing networks.

In other instances, user 101 may elect to approve the $930.00 real-time payment requested by merchant 111 for the now-completed landscaping project, and user 101 may provide input 355 to client device 102 (e.g., via input unit 109B) that selects "APPROVE" icon 352A. As illustrated in FIG. 3B, input unit 109B may route input data 356 indicative of provisioned input 355, and the selection of APPROVE" icon 352A by user 101, to a real-time payment (RTP) module 358 of executed mobile banking application 108. In some instances, executed RTP module 358 may perform operations that process input data 356 and generate a payment confirmation 360 indicative of the approval, by user 101, of the $930.00 real-time payment requested by merchant 111 for the now-completed landscaping project, and that store payment confirmation 360 within a corresponding portion of memory 105, e.g., in conjunction with or in association with payment notification 324. Further, executed RTP module 358 may also provide payment confirmation as an input to notification module 348 of executed mobile banking application 108, which may perform any of the exemplary processes described herein to present, via display unit 109A within notification interface 354, one or more interface elements that are representative of review notification 344 that prompt user 101 to provision, to client device 102 via input unit 109B, further input specifying a review of merchant 111 (e.g., "Josh's Stone and Landscaping") and additionally, or alternatively, of one or more products or services provided by merchant 111 (e.g., the lawn care and mulching services associated with the now-completed landscaping project, etc.).

Figure 3C:
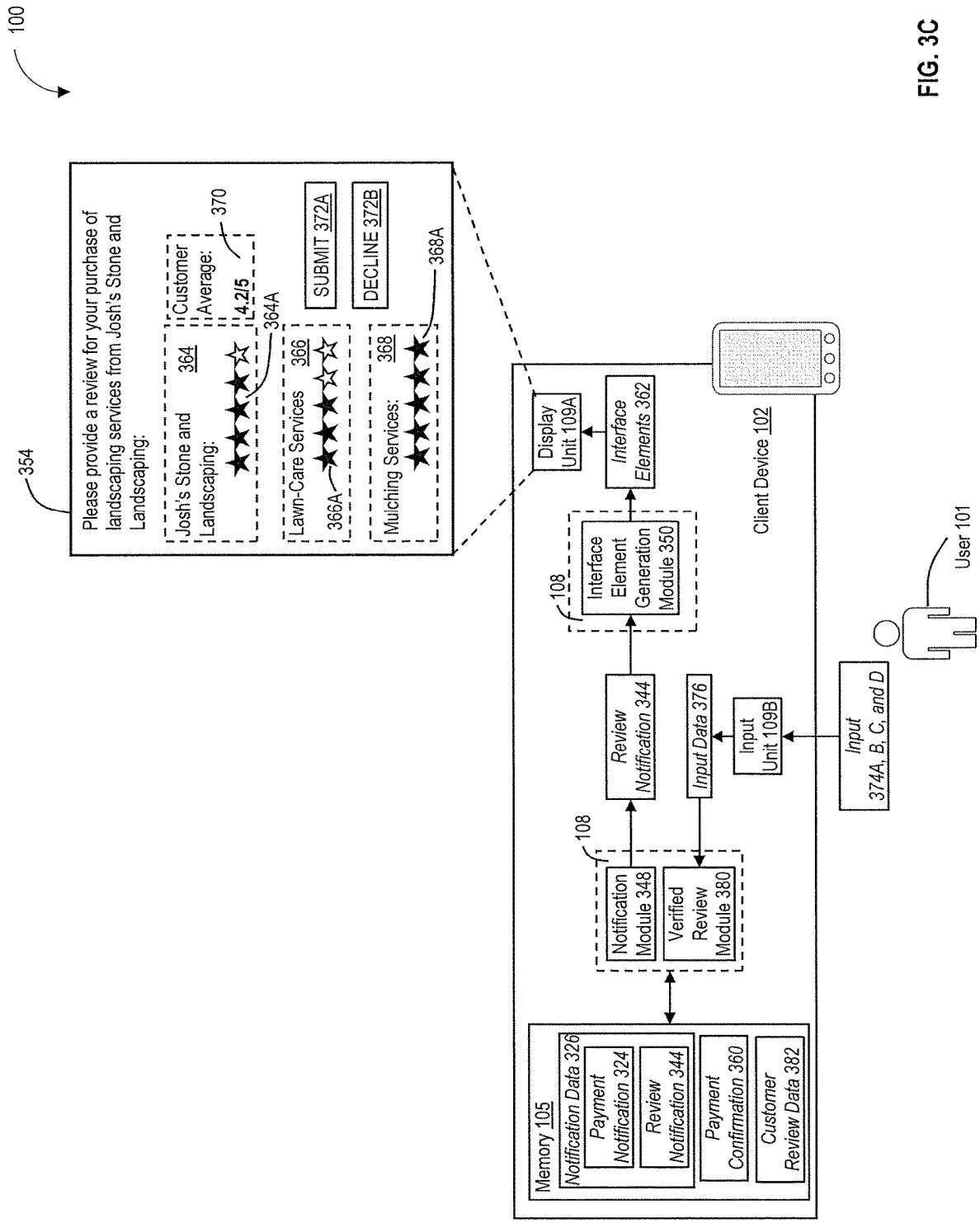

Referring to FIG. 3C, and in response to the receipt of payment confirmation 360, executed notification module 348 may perform operations that parse notification data 326 (e.g., as maintained within memory 105) and obtain review notification 344. As described herein, review notification 344 may include merchant identifier 338 (e.g., the name "Josh's Stone and Landscaping," the assigned alphanumeric identifier, etc.) the one or more elements of digital content 340 (along with the corresponding elements of layout data), and in some instances, one or more of customer identifier 328, payment date 330, account data 332, payment amount 334, or identifiers 336, which characterize the $930.00 payment requested by merchant 111 from user 101 on Oct. 1, 2021, for the landscaping services and products involved in the now-completed landscaping project. As illustrated in FIG. 3C, executed notification module 348 may provide review notification 344 as an input to executed interface element generation module 350, which may perform operations that generate and route interface elements 362 to display unit 109A. In some instances, when rendered for presentation within notification interface 354 by display unit 109A, interface elements 362 provide a graphical representation of review notification 344 to user 101 within a single display screen or window, or across multiple display screens or windows, of notification interface 354 (e.g., in accordance with the one or more elements of layout data, as described herein).

In some instances, upon presentation within notification interface 354, one or more of interface elements 362 may prompt user 101 to provide, as input to client device 102 (e.g. via input unit 109B), a review of a performance of Josh's Stone and Landscaping during a completion of the now-purchase landscaping project and additionally, or alternatively, and a review of one or more of the products or services involved in the completion of the now-purchased landscaping project, such as the lawn-care and mulching services described herein. For example, as interface elements 362 may one or more counterparty-specific interface elements 364 that, when presented within notification interface 354, prompt user 101 to provide input to client device 102 that specifies the user's satisfaction with Josh's Stone and Landscaping during the completion of the landscaping project (e.g., the timeliness, quality, or cost of the landscaping project completed by Josh's Stone and Landscaping). As illustrated in FIG. 3C, interface elements 364 may include review icons 364A, which may enable user 101 to select a star-based rating indicative of the satisfaction of user 101 with Josh's Stone and Landscaping, e.g., with zero stars corresponding to a minimum rating, and five stars correspond to a maximum rating. In other instances, interface elements 364 may include additional, or alternate interactive interface elements that enable user 101 to specify the corresponding numerical review of Josh's Stone and Landscaping, such as, but not limited to, a sliding interface element (e.g., establishing a sliding rating scale from zero to five, etc.) or discrete, selectable radio buttons (e.g., indicative of corresponding, integer-based ratings from zero to five, etc.) or that enable user 101 to provide textual comments on their experience with Josh's Stone and Landscaping, such as, but not limited to, one or more interactive text boxes.

Interface elements 362 may also include one or more product- or service-specific interface elements, such as interface elements 366 and 368, that, when presented within notification interface 354, prompt user 101 to provide input to client device 102 that specifies the user's satisfaction with respective of ones the lawn care services and the mulching services provided by Josh's Stone and Landscaping during the completion of the landscaping project (e.g., the timeliness, quality, or cost of the lawn care services or the mulching services, etc.). As illustrated in FIG. 3C, interface elements 366 may include review icons 366A, which may enable user 101 to select a star-based rating indicative of the satisfaction of user 101 with the lawn care services provided Josh's Stone and Landscaping, and interface elements 368 may include review icons 368A, which may enable user 101 to select a star-based rating indicative of the satisfaction of user 101 with the mulching services provided Josh's Stone and Landscaping, (e.g., with zero stars corresponding to a minimum rating, and five stars correspond to a maximum rating). In other instances, interface elements 366 and 368 may include additional, or alternate interactive interface elements that enable user 101 to specify the corresponding numerical review of respective ones of the lawn care and mulching services provided Josh's Stone and Landscaping, such as, but not limited to, a sliding interface element (e.g., establishing a sliding rating scale from zero to five, etc.) or discrete, selectable radio buttons (e.g., indicative of corresponding, integer-based ratings from zero to five, etc.) or that enable user 101 to provide textual comments on their experience with respective ones of the lawn care and mulching services provided Josh's Stone and Landscaping, such as, but not limited to, one or more interactive text boxes. The disclosed embodiments are, however, not limited to the exemplary counterparty-, product-, and/or service-specific interface elements described herein, and in other instances, notification interface 354 may present any additional, or alternate, interactive interface elements that prompt user 101 to provide input to client device 102 that specifies a counterparty-, product-, or service-specific review of Josh's Stone and Landscape, the now-purchased landscaping project, or the products or services involved in the landscaping project.

Further, and by way of example, interface elements 362 may include additional, or alternative, interface elements that, when presented within notification interface 354, provide a graphical representation of one or more verified reviews provided by customers of Josh's Stone and Landscaping during prior temporal intervals, such as, but not limited to, a one-month period, a six-month period, or a one-year period. For instance, and as described herein, review notification 344 may include elements of aggregated review data 342 that, among other things, specify an average value of a plurality of discrete, verified counterparty-specific ratings of Josh's Stone and Landscaping provided by customers of the financial institution associated with FI computing system 130, and received and aggregated by FI computing system 130, across a prior calendar year. In some examples, interface element generation module 350 of executed mobile banking application 108 may process the elements of aggregated review data 342 (e.g., as included within review notification 344), and generate the additional or alternate ones of interface elements 362, such as interface elements 370, that upon presentation within notification interface 354, provide user 101 with a graphical representation of the average counterparty-specific rating of Josh's Stone and Landscape over the prior calendar year.

For instance, each of the one or more verified reviews provided by customers of Josh's Stone and Landscaping during the prior calendar year may correspond to a star-based rating indicative of the satisfaction of corresponding ones of the customers with Josh's Stone and Landscaping (e.g., with zero stars corresponding to a minimum rating, and five stars correspond to a maximum rating), and elements of aggregated review data 342 may specify an average numerical rating of 4.2 for Josh's Stone and Landscaping (e.g., 4.2 stars out of a possible 5 stars). As illustrated in FIG. 3C, display unit 109A may present interface elements 370, which provide the graphical representation of the average rating of 4.2 stars out of the possible 5 stars, at a corresponding position within notification interface 354, e.g., at a position proximate to interface elements 364. The disclosed embodiments are, however, not limited to interface elements associated with the exemplary aggregate value of the counterparty-specific review, and in other instances, interface elements 362 may include further interface elements associated with additional, or alternate, aggregated values of the counterparty-specific reviews provided by customers of Josh's Stone and Landscaping, or with aggregated values of the product- or service-specific reviews provided by the customers of Josh's Stone and Landscaping, during the prior temporal intervals.

In some instances, when presented within notification interface 354, counterparty-specific interface elements 364 and service-specific interface elements 366 and 368 may prompt user 101 to provide, via input unit 109B, input to client device 102 that specifies respective ones of the starred counterparty-, product-, or service-specific reviews of Josh's Stone and Landscaping, the completed (and purchased) landscaping project, or the products or serviced associated with that landscaping project, e.g., based on input provided to input unit 109B of client device 102 that interacts with, and selects, respective ones of counterparty-specific review icons 364A and service-specific review icons 366A and 368A. Further, and as illustrated in FIG. 3C, the graphical representation of review notification 344 may prompt user 101 to submit the previously specified counterparty-, product-, or service-specific reviews to FI computing system 130 (e.g., based on additional input provided to input unit 109B of client device 102 that selects a "SUBMIT" icon 372A presented within notification interface 354) or alternatively, to decline to submit any counterparty-, product-, or service-specific reviews of Josh's Stone and Landscaping, the completed (and purchased) landscaping project, or the products or serviced associated with that landscaping project (e.g., based on additional input provided to input unit 109B of client device 102 that selects a "DECLINE" icon 372B presented within notification interface 354).

By way of example, and as illustrated in FIG. 3C, user 101 may provide, to input unit 109B, input 374A that interacts with corresponding one of counterparty-specific review icons 364A and specifies a counterparty-specific review of four out a possible five stars for Josh's Stone and Landscaping. User 101 may also provide, to input unit 109B, input 374B that interacts with corresponding one of service-specific review icons 366A and specifies a service-specific review of three out a possible stars for the landscaping services provided by Josh's Stone and Landscaping, and input 374C that interacts with corresponding one of service-specific review icons 368A and specifies a service-specific review of five out a possible stars for the mulching services provided by Josh's Stone and Landscaping. Further, in some instances, user 101 may elect to submit the specified counterparty- and service-specific reviews associated with landscaping project completed by Josh's Stone and Landscaping (e.g., the four-star counterparty-specific review of Josh's Stone and Landscaping, the three-star service-specific review of the provisioned lawn-care services, and the five-star review of the provisioned mulching services), and user may provide input 374D to input unit 109B that selects "SUBMIT" icon 372A.

As illustrated in FIG. 3C, input unit 109B may route input data 376 indicative of each of provisioned input 374A, 374B, 374C, and 374D (e.g., indicative of the specification of the four-star counterparty-specific review of Josh's Stone and Landscaping, the three-star service-specific review of the provisioned lawn-care services, and the five-star review of the provisioned mulching services, and the selection of "SUBMIT" icon 372A) to a verified review module 380 of executed mobile banking application 108. In some instances, executed verified review module 380 may perform operations that process input data 376 and generate one or more elements of customer review data 382 that identify the counterparty-specific review, and each of product- or service-specific reviews, provided by user 101 for Josh's Stone and landscaping. For example, the executed verified review module 380 may perform operations that, based on input data 376, access each of the starred counterparty-, product-, and/or service-specific reviews (e.g., the four-star counterparty-specific review of Josh's Stone and Landscaping, the three-star service-specific review of the provisioned lawn-care services, and the five-star review of the provisioned mulching services), transform each of the starred counterparty-, product-, and/or service-specific reviews into corresponding numerical ratings (e.g., a counterparty-specific numerical rating of four for Josh's Stone and Landscaping, a service-specific numerical rating of three for the provisioned lawn-care services, and a service-specific numerical rating of five for the provisioned mulching services), and package each of the counterparty-, product-, and/or service-specific numerical ratings into respective portions of customer review data 382, along corresponding ones of merchant identifier 338 and merchant or service identifiers 336. Executed verified review module 380 may also perform operations that store customer review data 382 within a corresponding portion of memory 105, e.g., in conjunction with or in association with payment confirmation 360 and payment notification 324.

Figure 4A:
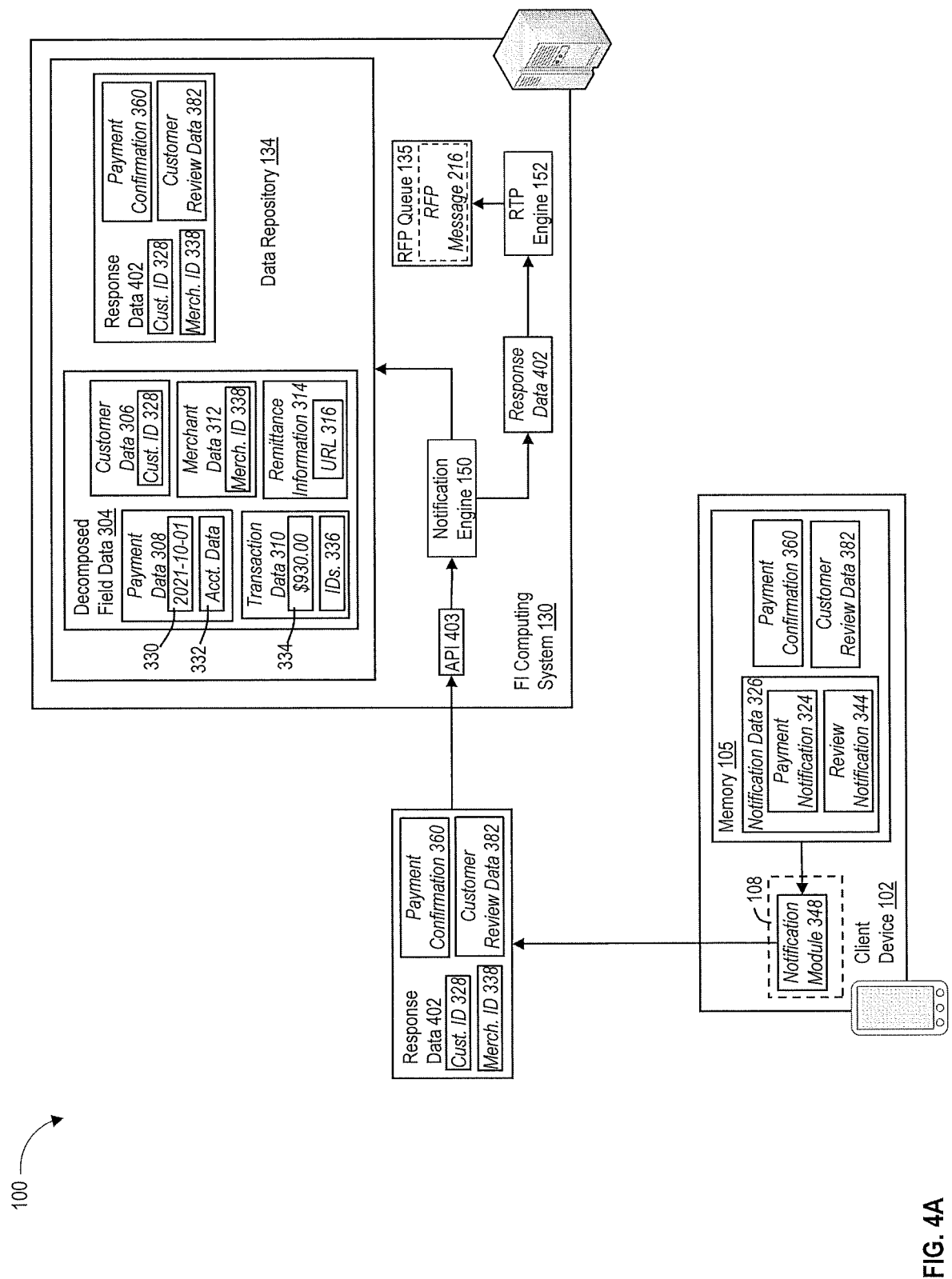

Referring to FIG. 4A, executed notification module 348 may perform operations that access memory 105 and obtain payment confirmation 360 and customer review data 382. Executed notification module 348 may package payment confirmation 360 and customer review data 382 into corresponding portions of response data 402, along with customer identifier 328 and additionally, or alternatively, merchant identifier 338. Executed notification module 348 may perform operations that cause client device 102 to transmit response data 402 across network 120 to FIG. computing system 130. In some instances, not illustrated in FIG. 4A, executed notification module 348 may also perform operations that obtain an encryption key associated with FI computing system 130 or executed mobile banking application 108 (e.g., a public cryptographic key associated with, and distributed by, FI computing system 130), and that encrypt all, or a selected portion of response data 402 using the encryption key prior to transmission across network 120.

In some instances, a programmatic interface established and maintained by FI computing system 130, such as application programming interface (API) 403, may receive response data 402 and may route response data 402 to executed notification engine 150. As described herein, one or more portions of response data 402 may be encrypted (e.g., using a public cryptographic key associated with FI computing system 130), and executed notification engine 150 may perform operations that access a decryption key maintaining within the one or more tangible, non-transitory memories of FI computing system 130 (e.g., a private cryptographic key associated with FI computing system 130), and that decrypt the encrypted portions of response data 402 using the corresponding decryption key. As illustrated in FIG. 4A, executed notification engine 150 may perform operation that store response data 402 within one or more tangible, non-transitory memories of FI computing system 130, e.g., within in conjunction with the elements of decomposed field data 304 within data repository 134. Further, executed notification engine 150 may provide response data 402 as an input to RTP engine 152, which, when executed by the one or more processors of FI computing system 130, may perform any of the exemplary processes described herein to execute, in real-time, the $930.00 payment requested by Josh's Stone and landscaping based on payment confirmation 360 (e.g., as maintained within response data 402) and in accordance with the elements of decomposed field data 304.

By way of example, executed RTP engine 152 may obtain, from response data 402, customer identifier 328 (e.g., the customer name or alphanumeric login credential of user 101, etc.), merchant identifier 338 (e.g., the merchant name or alphanumeric identifier of Josh's Stone and Landscaping, etc.), and the payment confirmation 360, and based on payment confirmation 360, executed RTP engine 152 may determine that user 101 approved the real-time payment of $930.00 requested by Josh's Stone and Landscaping on or before Oct. 1, 2021. In some instances, and based on the determination that user 101 approved the requested payment, executed RTP engine 152 may access the elements of decomposed field data 304, and may obtain account data 332 that identifies the payment instrument held by user 101 and capable of funding the requested payment (e.g., the account number "XXXX-1234-5678-9012," etc.), and payment amount 334 of the requested payment (e.g., $930.00).

Although not illustrated in FIG. 4A, executed RTP engine 152 may also perform operations that, in real-time, debit the $930.00 payment amount from the account associated with the payment instrument (e.g., the account associated with account number "XXXX-1234-5678-9012"), and generate one or more additional ISO-20022-compliant RTP messages that confirm the approval of the requested $930.00 payment by user 101 and the real-time debiting of the $930.00 in funds from the account associated with the payment instrument. In some instances, executed RTP engine 152 may perform additional operations (also not illustrated in FIG. 4A) that cause FI computing system 130 to transmit the one or more additional ISO-20022-compliant RTP messages across network 120 to merchant computing system 110, either directly or through one or more of intermediate computing systems 236 associated with participants in the RTP ecosystem, such as, but not limited to, the one or more computing systems associated with the clearinghouse. FI computing system 130 may also perform operations that access RFP message 216 maintained within RFP message queue 136, and delete RFP message 216 from RFP message queue 136.

Figure 4B:
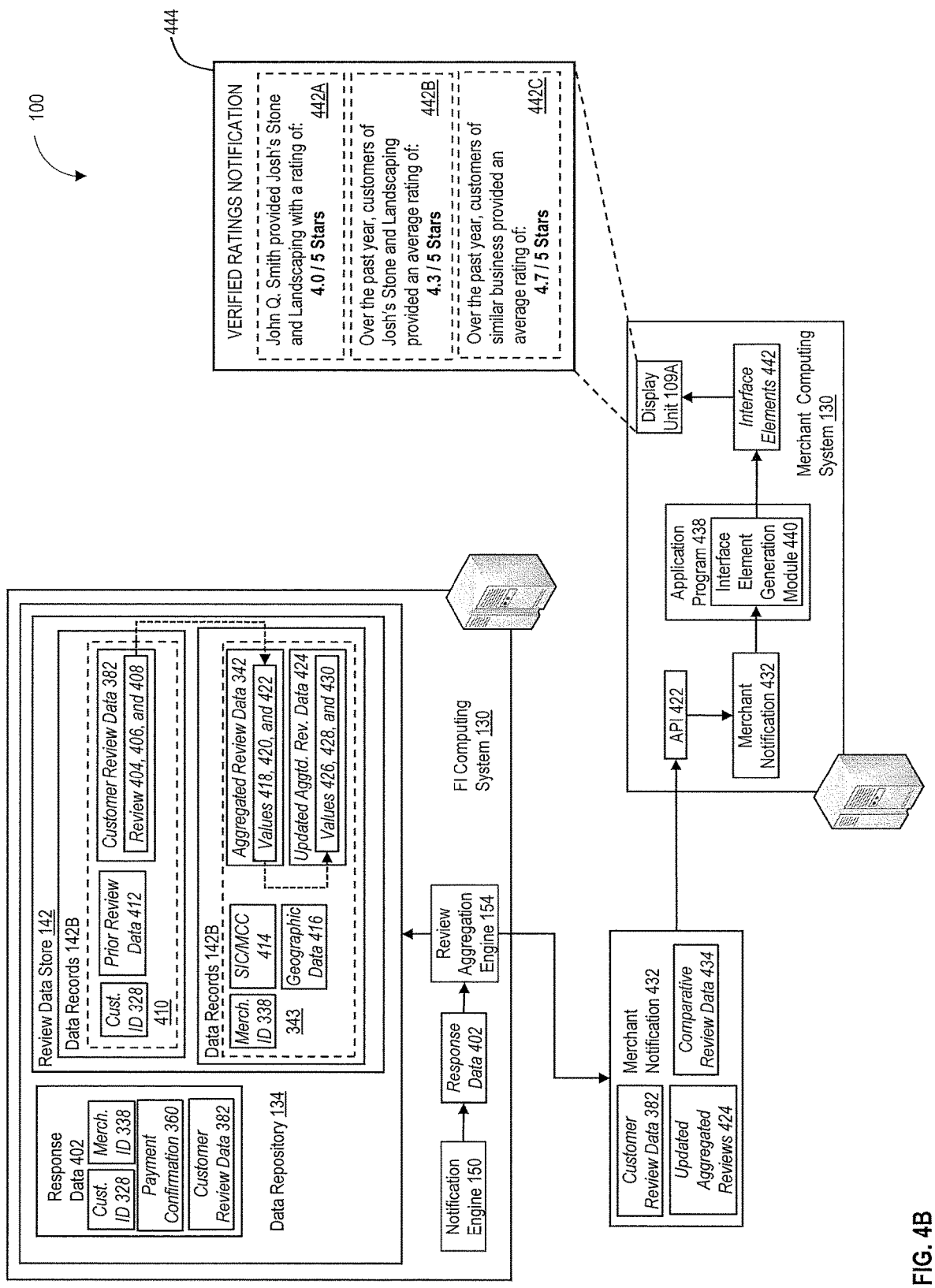

Referring to FIG. 4B, executed notification engine 150 may also provide response data 402 as an input to review aggregation engine 154, which, when executed by the one or more processors of FI computing system 130, may perform any of the exemplary processes described herein that the aggregate the one or more counterparty-product-, or service-specific reviews of Josh's Stone and Landscaping provided by user 101 with one or more counterparty-, product-, or service-specific reviews provisioned user 101 and by other customers of Josh's Stone and Landscaping during one or more prior temporal intervals. For example, executed RTP engine 152 may obtain, from response data 402, customer identifier 328 of user 101, merchant identifier 338 of merchant 111, and customer review data 382 specified by user 101, which may include a counterparty-specific review 404 of Josh's Stone and Landscaping (e.g., the counterparty-specific review of four out a possible five stars), a service-specific review 406 of the lawn-care services provided by Josh's Stone and Landscaping during completion of the landscaping project (e.g., the service-specific review of three out a possible five stars), and a service-specific review 408 of the mulching services provided by Josh's Stone and Landscaping during completion of the landscaping project (e.g., the service-specific review of five out a possible five stars). The disclosed embodiments are, however, not limited to these examples of counterparty- and service-specific review, and in other instances, customer review data 382 may include any additional or alternate counterparty-, product-, or service-specific reviews of Josh's Stone and Landscaping, the now-completed landscaping project, or any products or services involved in the now-completed landscaping project.

In some instances, executed review aggregation engine 154 may access review data store 142, and may perform operations that parse the structured or unstructured data records of data records 142A, and that identify a corresponding data record 410 that includes customer identifier 328 of user 101. As described herein, the data record 410 of data records 142A may include one or more elements of prior customer review data 412 that identify, and characterize, one or more counterparty-, product-, or service-specific reviews specified by user 101 for merchant 111 (e.g., Josh's Stone or Landscaping) or other merchants or retailers participating in the RTP ecosystem during one or more prior temporal intervals. As illustrated in FIG. 4A, executed review aggregation engine 154 may perform operations that store customer review data 382, which includes counterparty-specific review 404, service-specific review 406, and service-specific review 408 of Josh's Stone and Landscaping, within a corresponding portion of data record 410, e.g., in conjunction with customer identifier 328 and prior customer review data 412.

Executed review aggregation engine 154 may also access data records 142B of review data store 142, and may perform operations that parse the structured or unstructured data records of data records 142B and identify data record 343, which includes merchant identifier 338 of merchant 111 (e.g., the merchant name of, or alphanumeric identifier assigned to, Josh's Stone and Landscaping) and aggregated review data 342. As described herein, the elements of aggregated review data 342 may identify, and characterize, aggregated values of counterparty-specific reviews provisioned by customers of Josh's Stone and Landscaping during one or more prior temporal intervals, such as, but not limited to, an aggregated value 418 characterizing the discrete, counterparty-specific reviews of Josh's Stone and Landscaping specified by corresponding customers during the prior calendar year (e.g., 4.5 out of a possible five stars, etc.).

Further, as described herein, the elements of aggregated review data 342 may identify, and characterize, aggregated values of product- or service-specific reviews provisioned by customers of Josh's Stone and Landscaping during one or more prior temporal intervals, such as, but not limited to, an aggregated value 420 characterizing the discrete, service-specific reviews of the lawn-care services provided by Josh's Stone and Landscaping and specified by corresponding customers during the prior calendar year (e.g., 3.8 out of a possible five stars, etc.), and an aggregated value 422 characterizing the discrete, service-specific reviews of the mulching services provided by Josh's Stone and Landscaping and specified by corresponding customers during the prior calendar year (e.g., 4.6 out of a possible five stars, etc.). The disclosed embodiments are, however, not limited to these examples of aggregated counterparty- and service-specific review, and in other instances, the elements of aggregated review data 342 may include any additional or alternate aggregated, counterparty-, product-, or service-specific reviews of Josh's Stone and Landscaping, the now-completed landscaping project, or any products or services involved in the now-completed landscaping project during the prior temporal interval.

In some examples, illustrated in FIG. 4A, executed review aggregation engine 154 may also process the elements of aggregated review data 342, customer review data 382, prior customer review data 412, and additional elements of prior customer review data provisioned by other customer of Josh's Stone and Landscaping. Executed review aggregation engine 154 may also perform operations that generate one or more elements of updated aggregated review data 424 that reflect the impact, on respective ones of the aggregated values of the counterparty-, product-, or service-specific reviews of Josh's Stone and Landscaping included within aggregated review data 342, of the counterparty-, product-, or service-specific reviews of Josh's Stone and Landscaping newly provisioned by user 101, e.g., as maintained within customer review data 382. By way of example, aggregated value 418 may include an average value of a plurality of discrete, verified, counterparty-specific review of Josh's Stone and Landscaping provisioned by corresponding customers during the prior calendar year, and executed review aggregation engine 154 may perform operations that compute an updated aggregated value 426 (e.g., an average numerical value) based on the numerical values of the plurality of discrete, verified, counterparty-specific review of Josh's Stone and Landscaping provisioned by corresponding customers (e.g., as maintained within the structured or unstructured data records of data records 142A) and the numerical value of the counterparty-specific review of Josh's Stone and Landscaping newly provisioned by user 101 (e.g., as maintained within counterparty-specific review 404 of customer review data 382).

Executed review aggregation engine 154 may package updated aggregated value 426 within a corresponding portion of updated aggregated review data 424. Further, executed review aggregation engine 154 may also perform any of these exemplary processes to compute an updated, average numerical review of the lawn-care services provisioned by Josh's Stone and Landscaping (e.g., updated aggregate value 428), and for the mulching services provisioned by Josh's Stone and Landscaping (e.g., updated aggregate value 430), and to package each of the updated aggregate values 428 and 430 within updated aggregated review data 424.

As described herein, executed review aggregation engine 154 may perform operations that aggregate, within corresponding ones of data records 142B of review data store 142, a plurality of discrete, verified, counterparty-, product-, or service-specific reviews of one or more merchants participating in the RTP ecosystem on a counterparty-by-merchant basis (e.g., as aggregated review data 342 and updated aggregated review data 424 for merchant 111 within data record 343 of data records 142B, etc.). In other examples, executed review aggregation engine 154 may perform any of the exemplary processes described herein to generate, and subsequently update, elements of aggregated counterparty-, product-, and/or service-specific review data for groups of merchants characterized by a common Standard Industrial Classification (SIC) code, a standard Merchant Classification Code (MCC), and additional or alternate, a common geographic region.

For instance, data record 343 associated with Josh's Stone and Landscaping may, in addition to merchant identifier 338, also include data 414 that includes a SIC or MCC code assigned to Josh's Stone and Landscaping and geographic data 416 that identifies a geographic region in which Josh's Stone and Landscaping operates (e.g., all, or a portion of, the street address of merchant 111, such as a city of operation or a postal code, etc.). Although not illustrated in FIG. 4A, executed review aggregation engine 154 may perform operations that generate, update, and maintain additional data records within data records 142B that include aggregated values of the counterparty-, product-, or service-specific reviews for a plurality of merchants associated with the SIC or MCC code assigned to Josh's Stone and Landscaping (e.g., as specified within data 414) and additionally, or alternatively, that operate within the geographic region associated with Josh's Stone and Landscaping (e.g., as specified within geographic data 416). The disclosed embodiments are, however, not limited to merchant groupings associated with common SIC codes, common MCCs, or common geographic regions, and in other instances, executed review aggregation engine 154 may perform any of the exemplary processes described herein to generate, and subsequently update, elements of aggregated counterparty-, product-, and/or service-specific review data for groups of merchants associated with any additional, or alternate, common merchant characteristic, or any additional, or alternate, combination of common merchant characteristics.

Referring back to FIG. 4A, executed review aggregation engine 154 may also perform operations that package all, or a selected portion of, customer review data 382 and updated aggregated review data 424 into corresponding portions of a merchant notification 432, either alone or in conjunction with elements of comparative review data 434 that identify, and characterize, aggregated values of counterparty-, product-, or service-specific reviews for groups of merchants that share a common SIC code or MCC code with merchant 111 (e.g., as specified by data 414), that share a common geographic region with merchant 111 (e.g., as specified within geographic data 416), or that share any additional, or alternate merchant characteristics with merchant 111, including any combination thereof. Executed review aggregation engine 154 may also perform operations that cause FI computing system 130 to transmit merchant notification 432 across network 120 to merchant computing system 110 in accordance with a predetermined schedule (e.g., on a daily, weekly, or monthly basis, etc.) or in response to a request generated and transmitted by one or more application programs executed by merchant computing system 110, such as, but not limited to, a mobile banking application or a web browser.

As illustrated in FIG. 4B, a programmatic interface established and maintained by merchant computing system 110, such as an application programming interface (API) 436, may receive merchant notification 432, and may route merchant notification to an application program 438 executed by the one or more processors of merchant computing system 110, such as, but not limited to, an executed web browser or an executed banking application. In some examples, an interface element generation module 440 of executed application program 438 (e.g., the executed web browser or the executed banking application), and executed interface element generation module 350 may perform operations that generate and route interface elements 442 to a display unit 109A of merchant computing system 110. By way of example, display unit 109A may include, but is not limited to, an LCD display unit, a pressure-sensitive touch-screen display unit, or another appropriate type of display unit appropriate to merchant computing system 110. In some instances, when rendered for presentation within a corresponding notification interface 444 by display unit 109A, interface elements 442 provide a graphical representation of one or more of the counterparty-, product-, or service-specific reviews of Josh's Stone and Landscaping newly provided by user 101 (e.g., in response to the approval of the request, real-time payment of $930.00), one or more aggregated values of the counterparty-, product-, or service-specific reviews of Josh's Stone and Landscaping during a prior temporal interval (e.g., the prior calendar year), and additionally, or alternatively, one or more aggregated values of counterparty-, product-, or service-specific reviews of merchants that share common merchant or geographic characteristics with Josh's Stone and Landscaping, such as merchants that provide landscaping services in the Washington, D.C., area.

For example, when rendered for presentation within notification interface 444 by display unit 109A, a subset 442A of interface elements 442 may indicate that user 101 elected to assign, to Josh's Stone and Landscaping, a counterparty-specific review of four out of a possible five stars (e.g., a numerical rating of four). Further, and when rendered for presentation within notification interface 444, an additional subset 442B of interface elements 442 may indicate that customers of Josh's Stone and Landscaping assigned an average value of a counterparty-specific review of 4.3 stars out of a potential five stars over the past calendar year, and a further subset 442C of interface elements 442 may indicate that customers assigned an average values of a counterparty-specific review of 4.7 stars out of a potential five stars to landscaping services within the Washington, D.C., metropolitan area across the prior calendar year. The disclosed embodiments are, however, not limited to graphical representations of counterparty-specific review, and in other instances, when rendered for presentation within notification interface 444, interface elements 442 may provide a graphical representation of any additional or alternate product- or service-specific review of Josh's Stone and Landscaping, either on an individual or aggregate basis, or a graphical representation of any additional or alternate aggregated product- or service-specific review of merchants sharing common merchant or geographic characteristics with Josh's Stone and Landscaping.

Through an implementation of one or more of the exemplary processes described herein, FI computing system 130 may perform operations that provision, to merchant computing system 110 of merchant 111, not only data identifying and characterizing one or more discrete counterparty-, product-, or service-specific reviews during a current temporal interval, but also data characterizing aggregated values of counterparty-, product-, or service-specific reviews provisioned by customers of merchant 111 during prior temporal intervals, and further, data characterizing aggregated values of counterparty-, product-, or service-specific reviews provisioned by customers of merchants that share one or more common merchant or geographic characteristics with merchant 111 during the prior temporal intervals. As described herein, each of these counterparty-, product-, or service-specific reviews may correspond to a "verified" review associated with not only an initiated purchase transaction involving a corresponding customer and one or more products or services provisioned by merchant 111 or the similar merchants (e.g., the purchased products and services associated with the landscaping project completed by Josh's Stone and Landscaping), but also with a real-time payment approved by the corresponding customer and executed by FI computing system 130 in conjunction with one or more of intermediate computing systems 236 associated with participants in the RTP ecosystem (e.g., the real-time payment of $930.00 requested by Josh's Stone and Landscaping and approved by user 101 using any of the exemplary processes described herein).

These provisioned elements of data, when rendered for presentation within a corresponding digital interface of an application program executed at merchant computing system 110 (e.g., notification interface 444 of executed application program 438), may enable merchant 111 to characterize a level of satisfaction expressed by actual customers of merchant 111 involved in actual purchases of products or services offered by merchant during a current temporal interval or during one or more prior temporal intervals, and to compare the level of satisfaction with similar counterparty-, product-, or service-specific levels of expressed by actual customers of similar merchants during the current or prior temporal intervals. Certain of these exemplary processes, which leverage verified reviews of actual customers of merchant 111 and the similar merchants, may implemented in addition to, or as an alternate to, processes implemented by many crowd-sourced platforms that solicit merchant reviews from customers, which often fail to impose any affirmative link between a counterparty-, product-, or service-specific review provisioned by a corresponding customer and an initiated, and subsequently funded and executed, purchase transaction involving the corresponding customer.

In some examples, described herein, notification module 348 of executed mobile banking application 108 may perform operations that cause client device 102 transmit, across network 120 to FI computing system 130, payment confirmation 360 (e.g., indicating the approval, by user 101, of the $930.00 real-time payment requested by merchant 111 for the now-completed landscaping project) and customer review data 382 (e.g., including counterparty-specific review 404, service-specific review 406, and service-specific review 408 of Josh's Stone and Landscaping, as specified by user 101) within a single response to notification data 326, e.g., within response data 402 of FIG. 4A. In other examples, executed notification module 348 may perform operations that, upon receipt of payment confirmation 360 from executed RTP module 358 (e.g., response to a provisioning of input 355 to client device 102 via input unit 109B), generate one or more elements of additional response data that include payment confirmation 360, along with customer identifier 328 and/or merchant identifier 338, and that cause client device 102 transmit the one or more elements additional response data to FI computing system 130. By way of example, the operations performed by executed notification module 348 may cause client device 102 to transmit the elements of additional response data to FI computing system prior to presenting any of interface elements 362 within notification interface 354, or alternatively, subsequent to the presentation of interface elements 362 within notification interface 354, but prior to receipt of any of inputs 374A, 374B, 374C, or 374D by input unit 109B. Through an implementation of these exemplary processes, executed mobile banking application 108 may facilitate a delay in the transmission of the specified counterparty-, product-, or service-specific review of Josh's Stone and Landscaping to FI computing system 130, and which may provide user 101 with additional time to consider the counterparty-, product-, or service-specific review of Josh's Stone and Landscaping.

In some instances, user 101 may elect to approve the real-time payment of $930.00 requested by merchant 111 for the now-completed landscaping project (e.g., based on input 355 provisioned to input unit 109B in response to presented interface elements 352), but may decline to provide any counterparty-, product-, or service-specific review associated with merchant 111. By way of example, although not illustrated in FIGS. 3A-3C or FIGS. 4A-4B, user 101 may provide additional input to input unit 109B that "DECLINE" icon 372B presented within notification interface 354, and based on the provisioned input, executed verified review module 380 may perform operations that package information characterizing the declined reviews within a corresponding portion of customer review data 382, which executed notification module 348 may package into response data 402. In some examples, executed review aggregation engine 154 may perform any of the exemplary processes described herein to obtain customer review data 382, which includes the information characterizing the declined reviews, from response data 402, and to store customer review data 382 within a corresponding one of data records 142A associated with user 101, such as data record 410 of FIG. 4A. Further, and based on the information characterizing the declined reviews, executed review aggregation engine 154 may decline to perform any additional, or alternate, ones of the review aggregation processes described herein.

Further, and as described herein, user 101 may elect to approve the real-time payment of $930.00 requested by merchant 111 for the now-completed landscaping project, e.g., based on a provisioning of input 355 to input unit 109B that selects "APPROVE" icon 352A of notification interface 354. In other instances, not illustrated in FIGS. 3A-3C or FIGS. 4A-4B, user 101 may elect to reject the requested real-time payment, and may provision additional input to input unit 109B of client device 102 that selects "REJECT" icon 352B of notification interface 354. Based on the additional input indicative of the rejection of the requested, real-time payment by user 101, RTP module 358 of executed mobile banking application 108 may perform any of the exemplary processes described herein to generate an additional payment confirmation indicating the rejection of the requested, real-time payment by user 101, and notification module 348 of executed mobile banking application 108 may perform any of the exemplary processes described herein to generate elements of additional response data that include the additional payment confirmation, in conjunction with customer identifier 328 and/or merchant identifier 338, to cause client device 102 to transmit the elements of additional response data across network 120 to FI computing system 130. Executed notification module 348 may also perform operations that discard payment notification 324 and review notification 344, and in view of the rejection of the requested, real-time payment by user 101, executed notification module 348 may decline to present any further interface elements within notification interface 354 that prompt user 101 to specify a counterparty-, product-, or service-specific review of merchant 111 (not illustrated in FIGS. 3A-3C or FIGS. 4A-4B).

Based on the additional payment confirmation indicating the rejection of the requested, real-time payment by user 101 (e.g., based on additional input selecting "REJECT" icon 352B), FI computing system 130 may perform operations (not illustrated in FIGS. 3A-3C or FIGS. 4A-4B) that delete RFP message 216 from RFP message queue 136, and generate and transmit one or more ISO-20022-compliant messages to merchant computing system 110 indicative of the rejected payment, either directly across network 120 or through one or more of intermediate computing systems 236 associated with participants in the RTP ecosystem, such as, but not limited to, the one or more computing systems associated with the clearinghouse. Further, and based on the indication of the rejection of the requested, real-time payment by user 101, merchant computing system 110 may perform operations that enable merchant 111 to request one or more additional forms of payment from user 101 for the now-completed landscaping project, e.g., using one or more conventional payment rails or payment networks.

As described herein, FI computing system 130 may maintain, within data records 142B of review data store 142, aggregated values of counterparty-, product-, or service-specific verified reviews of corresponding merchants that participate in the RTP ecosystem. For example, data record 410 of data records 142B may maintain elements of updated aggregated review data 424, which characterize aggregated values of counterparty-, product-, and service-specific verified reviews of merchant 111 provided by corresponding customers across a prior temporal interval (e.g., a prior calendar year, etc.), and may include merchant identifier 338 of merchant 111 (e.g., the customer name or alphanumeric identifier of Josh's Stone and Landscaping), data 414 that includes a SIC or MCC code assigned to merchant 111 and geographic data 416 that identifies a geographic region in which merchant 111 operates (e.g., all, or a portion of, the street address of Josh's Stone and Landscaping, such as a city of operation or a postal code, etc.). Further, although not illustrated in FIG. 4A or 4B, data record 410 associated with merchant 111, and further data records associated with others of the corresponding merchants, may include data characterizing values of additional, or alternate, merchant characteristics, such as, but not limited to those specified within the elements of decomposed field data 304.

In some instances, FI computing system 130 may also perform operations that receive, from computing devices or systems operating within environment 100 via a corresponding digital portal, a request to query the aggregated values of counterparty-, product-, and service-specific verified reviews maintained for corresponding merchants within data records 142B of review data store 142, e.g., based on one or more of the values of merchant or geographic characteristics maintained within corresponding ones of data records 142B. For example, FI computing system 130 may expose an application front-end of one or more executed application programs, engine, or modules, such as a query engine 156, to web browser 106 executed by the one or more processors of client device 102. Based on input provided by user 101 to input unit 109B (e.g., that specifies a corresponding uniform resource locator (URL) associated with the exposed application front-end), executed web browser 106 may access a web page associated with a query functionality of executed review aggregation engine 154, and present at least a portion of the accessed web page within a corresponding digital interface, such as, but not limited to, a browser window 500 of FIG. 5A.

Figures 5A, 5B:
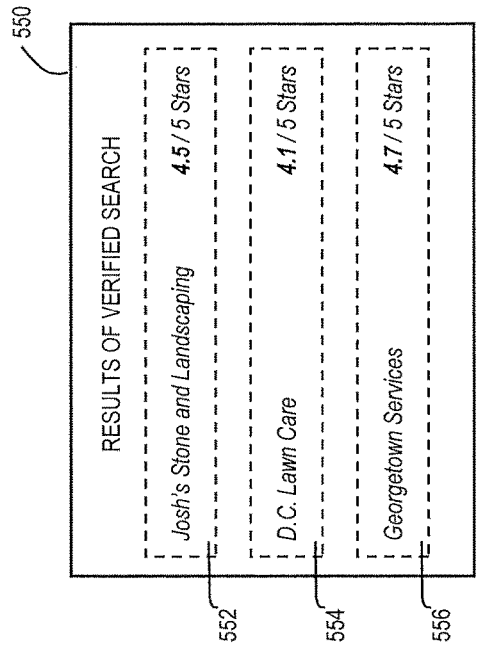
FIGS. 5A and 5B are diagrams illustrating portions of an exemplary digital interface, in accordance with some exemplary embodiments.

As illustrated in FIG. 5A, browser window 500 may include one or more interactive interface elements 501 that prompt user 101 to provide further input to client device 102 specifying a value of one or more parameters for a query of the aggregated values of counterparty-, product-, and service-specific verified reviews maintained by FI computing system 130. For example, a subset 502 of interface elements 501 may include, among other things, a fillable text box 502A that prompts user 101 to provide input that specifies all, or a selected portion of, a merchant name, and a subset 504 of interface elements 501 may include, among other things, a fillable text box 504A that prompts user 101 to provide input that identifying a product or service, and a subset 506 of interface elements 501 may include, among other things, a fillable text box 506A that prompts user 101 to provide input that specifies geographic data, such as a portion of a street address or a postal code. The disclosed embodiments are, however, not limited to presented interface elements that prompt user 101 to specify portions of a merchant name, a name of product or service, or elements of geographic data, and in other instances, interface elements 501 may include interactive interface elements, such as fillable text boxes, that prompt user 101 to specify any additional, or alternate, value of a merchant or geographic characteristic appropriate to review data store 142.

For example, user 101 may provide input to input unit 109B of client device 102 that enters a product name, e.g., "landscaping," within fillable text box 504A and that enters a postal code, e.g., "20007," within fillable text box 506A, and may provide further input to input unit 109B that selects "SUBMIT" icon 508 within browser window 500. Based on the provisioned input, executed web browser 106 may generate a query request that include the specified parameter values (e.g., the product name "landscaping" and the postal code "20007"), and may perform operations that cause client device 102 to transmit the query request across network 120 to FI computing system 130. The query request may, for example, be structured in accordance with an HTTP communication protocol, and the application front-end of executed query engine 156 may receive the query request from client device 102, and may perform operations that validate the query request and route the validated query request to executed query engine 156.

In some instances, executed query engine 156 may process the validated query request, obtain the specified parameter values (e.g., the product name "landscaping" and the postal code "20007"), and parse data records 142B to identify one or more of the merchants that participate in the RTP ecosystem and associated with merchant or geographic characteristics consistent with the specified parameter values. For each of the one or more identifier merchants, executed query engine 156 may obtain, from a corresponding one of data records 142B, a corresponding merchant identifier (e.g., merchant identifier 338 of merchant 111, as maintained within data record 410 of data records 142B) and at least one of the aggregated values of the counterparty-, product-, or service-specific reviews (e.g., at least one of updated aggregated value 426, 428, and 430). Executed query engine 156 may perform additional operations that package each of the merchant identifiers and the corresponding aggregated values of the counterparty-, product-, and/or service-specific reviews into corresponding portions of a query response, and that cause FI computing system 130 to transmit the query response across network 120 to client device 102, e.g., via the application front-end.

Client device 102 may receive the query response from FI computing system 130, and executed web browser 106 may render portions of the query response for presentation within an additional browser window of executed web browser 106, such as browser window 550 of FIG. 5B. As illustrated in FIG. 5B, additional browser window 550 may include interface elements that identify, and characterize, all or a selected subset of the merchants having corresponding merchant characteristics consistent with the query parameter values, and that characterize the corresponding aggregated values of the counterparty-, product-, and/or service-specific reviews. For example, interface elements 552 may provide a graphical representation of merchant identifier 338 of merchant 111 (e.g., the merchant name of "Josh's Stone and Landscaping") and a graphical representation of the aggregated value of the counterparty-specific, verified review of merchant 111 over the past calendar year (e.g., 4.5 out of a possible five stars, as specified within updated aggregated value 426 of merchant 111). Interface elements 554 may provide a graphical representation of a merchant identifier of an additional merchant (e.g., the merchant name of "D.C. Lawn Care") and a graphical representation of the aggregated value of the counterparty-specific, verified review of the additional merchant over the past calendar year (e.g., 4.1 out of a possible five stars), and interface elements 556 may provide a graphical representation of a merchant identifier of a further merchant (e.g., the merchant name of "Georgetown Services") and a graphical representation of the aggregated value of the counterparty-specific, verified review of the further merchant over the past calendar year (e.g., 4.7 out of a possible five stars).

Through an implementation of one or more of the exemplary processes described herein, FI computing system 130 may provision, to computing devices or systems operable by potential customers of merchants that participate in the RTP ecosystem, and to computing devices or systems operable by these participating merchants, data characterizing one or more of the participating merchants having characteristics that are consistent with one or specified query parameters and one or more "verified" counterparty-, product-, or service-specific reviews of the participating merchants that are associated with not only an initiated purchase transaction involving a corresponding customer, but also with real-time payment approved by the corresponding customer and executed by FI computing system 130 in conjunction with one or more of intermediate computing systems 236 associated with participants in the RTP ecosystem. Certain of these exemplary processes, which facilitate a customer- or counterparty-query of verified counterparty-, product-, or service-specific reviews, may implemented in addition to, or as an alternate to, query functionalities provided by many existing, crowd-sourced platforms, which often fail to impose any affirmative link between a counterparty-, product-, or service-specific review provisioned by a corresponding customer and an initiated, and subsequently funded and executed, purchase transaction involving the corresponding customer.

Figure 6A:
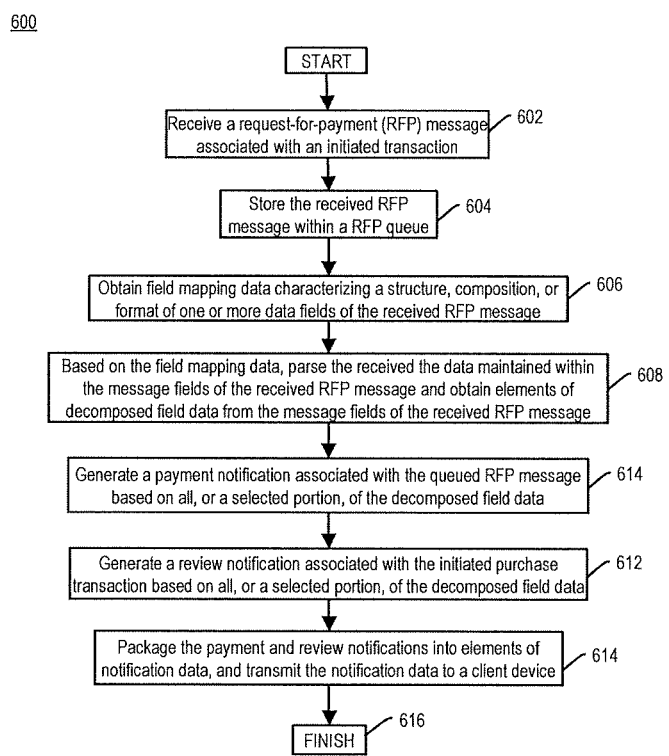
FIGS. 6A, 6B, and 6C are flowcharts of exemplary processes for obtaining and aggregating one or more verified reviews that characterize an initiated exchange of data based on an RFP message formatted and structured in accordance with one or more standardized data-exchange protocols, in accordance with some exemplary embodiments.
Figure 6B:
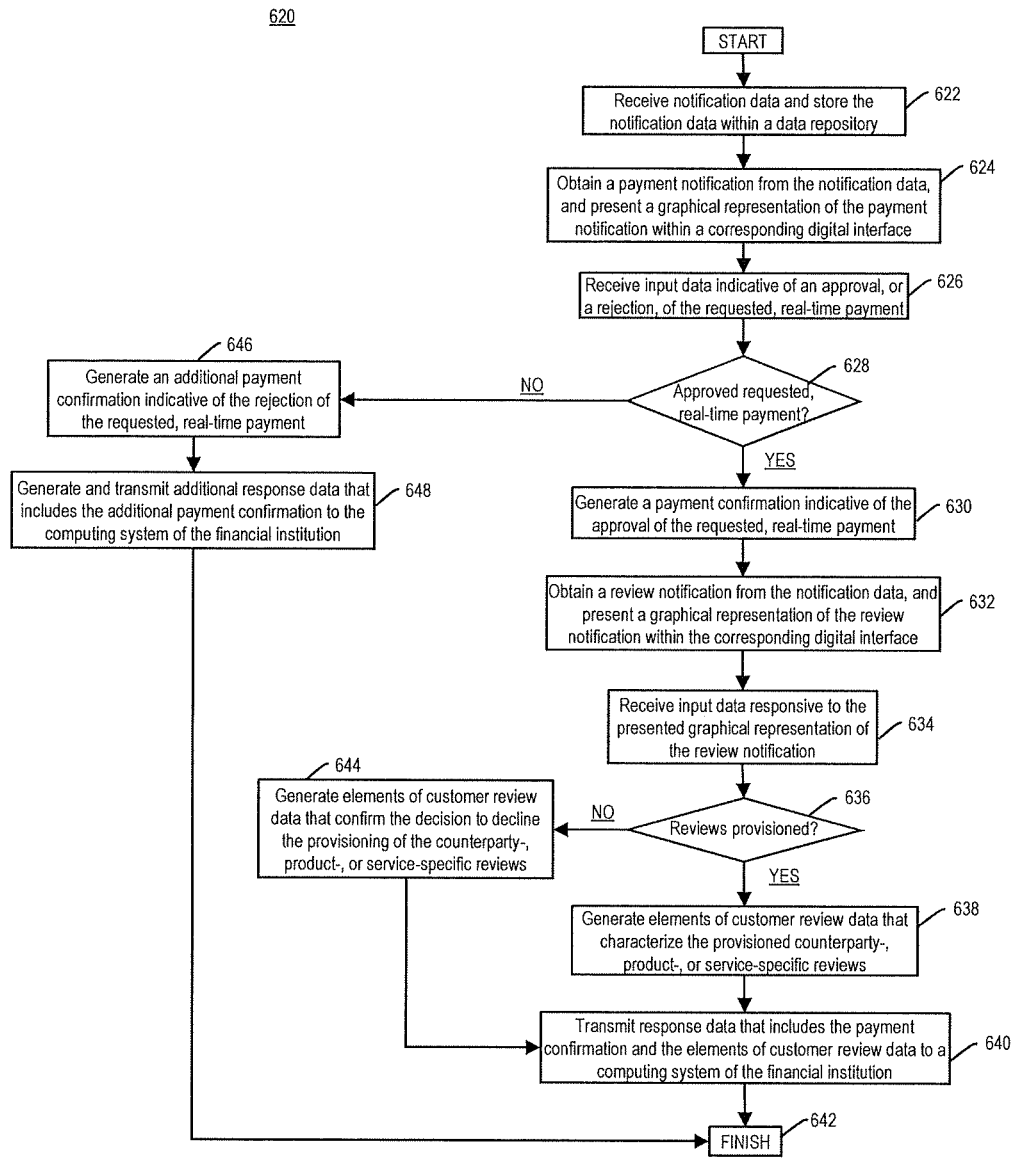
Figure 6C:
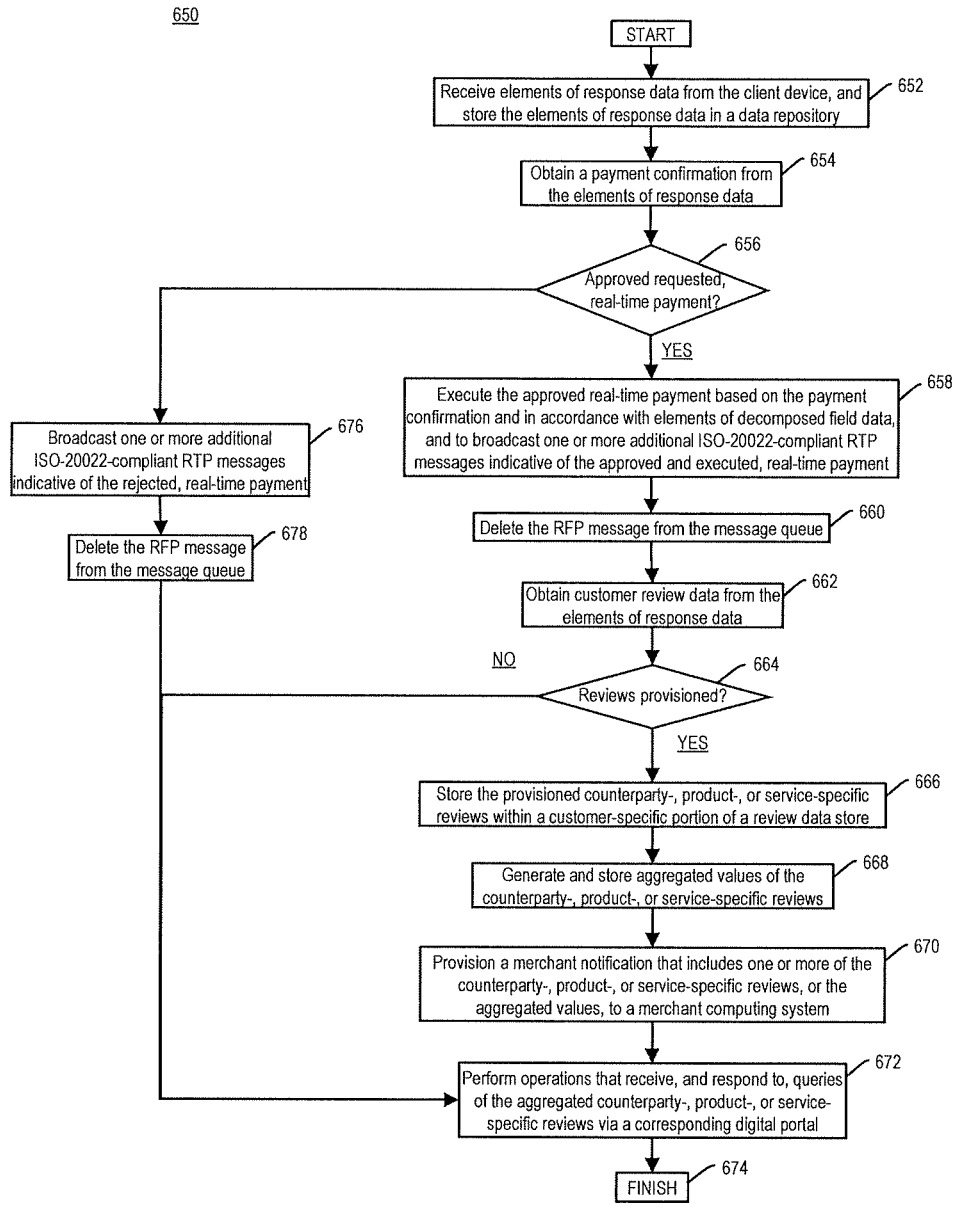

FIGS. 6A, 6B, and 6C are flowcharts of exemplary processes for obtaining and aggregating one or more verified reviews that characterize an initiated exchange of data in real-time, and contemporaneously with the initiation of the data exchange, based on a request-for-payment (RFP) message formatted and structured in accordance with one or more standardized data-exchange protocols. For example, one or more computing systems associated with a financial institution, such as FI computing system 130, may perform one or more of the steps of exemplary process 600, as described below in reference to FIG. 6A, and one or more of the steps of exemplary process 650, as described below in reference to FIG. 6C. Further, a computing device associated with, or operable by, user 101, such as client device 102, may perform one or more of the steps of exemplary process 620, as described below in reference to FIG. 6B.

Referring to FIG. 6A, FI computing system 130 may perform any of the processes described herein to obtain a RFP message associated with the initiated exchange of data (e.g., in step 602). As described herein, the data exchange may include, but is not limited to, a purchase transaction initiated between a first counterparty (e.g., a merchant, such as merchant 111 associated with merchant computing system 1110) and a second counterparty (e.g., a customer of the merchant, such as user 101 associated with client device 102), and the purchase transaction may involve, or be associated with one or more products or services provisioned by the first counterparty to the second counterparty (e.g., the lawn-care services, the mulching services, the bags of mulch, etc.).

The RFP message may be generated by merchant computing system 110 using any of the exemplary processes described herein, and in some instances, FI computing system 130 may receive the RFP message directly from merchant computing system 110 across a corresponding communications network (e.g., network 120), or may receive the RFP message from via one or more intermediate computing systems 236, such as, but not limited to, as a computing system associated with the financial institution of merchant 111 or one or more computing systems of a clearinghouse associated with the RTP ecosystem. In other instances, the RFP message may be generated by one of intermediate computing systems 236, such as the computing system associated with the financial institution of merchant 111 or the one or more computing systems of the clearinghouse, based on elements of data characterizing the purchase transaction and generated by merchant computing system 110.

As described herein, the received RFP message may include message fields consistent with the ISO 20022 standard for electronic data exchange between financial institutions, and each of the message fields may be populated with data structured and formatted in accordance with the ISO 20022 standard. By way of example, the received, ISO-20022-compliant RFP message may include, among other things: (i) message fields populated with data specifying a full name and postal address of user 101; (ii) message fields populated with data identifying a payment instrument selected by user 101 to fund the initiated purchase transaction; (iii) message fields populated with data specifying a name and postal address of merchant 111; (iv) message fields populated with data identifying a financial services account held by merchant 111 and available to receive processed from the requested payment; and (v) message fields populated with one or more parameter values that characterize the purchase transaction, a requested payment method, and/or a requested payment date. Further, and as described herein, the received, ISO-20022-compliant RFP message may also include structured or unstructured message fields that specify additional remittance information associated with the purchase transaction, and examples of the additional remittance information include, but are not limited to, information identifying a product or service involved in the purchase transaction, or a link to remittance data associated with the initiated transaction (e.g., a long-form URL or shortened to a PDF or HTML invoice, as described herein).

Referring back to FIG. 6A, FI computing system 130 may store the received RFP message within a corresponding portion of locally accessible data repository, such as within RFP message queue 136 of data repository 134 (e.g., in step 604 of FIG. 6A), and may obtain, from the locally accessible data repository, one or more elements of field mapping data that characterize a structure, composition, or format of one or more data fields of the received RFP message (e.g., in step 606 of FIG. 6A). Based on the obtained elements of the field mapping data, FI computing system 130 may perform any of the exemplary processes described herein to parse the data maintained within the message fields of the received RFP message, and to obtain elements of decomposed field data that identify and characterize user 101, merchant 111, the purchase transaction, and the payment requested from user 101 by merchant 111 for the purchased products or services (e.g., in step 608 of FIG. 6A). For example, the elements of decomposed field data may include, but are not limited to, customer data that identifies a full name or address of user 101, payment data that identifies a requested payment date or a payment instrument selected by user 101 to fund the purchase transaction, transaction data that identifies a requested payment amount or a requested payment currency, and merchant data that includes a name of merchant 111, a postal address associated with merchant 111, or information identifying a merchant account capable of receiving proceeds from the purchased transaction. Further, and as described herein, the elements of decomposed field data may also include additional elements of structured or unstructured remittance data, such as, but not limited to, a long-form URL or a shortened URL that point to elements of formatted receipt data (e.g., in PDF or HTML form) associated with the initiated purchase transaction and maintained at one or more additional computing systems, such as merchant computing system 110.

FI computing system 130 may perform any of the exemplary processes described herein to generate one or more elements of a payment notification associated with the queued RFP message based on all, or a selected portion, of the decomposed field data (e.g., in step 610 of FIG. 6A). By way of example, and as described herein, the payment notification may be associated with the requested payment, and that payment notification may include, among other things, the full name of user 101, the requested payment date, information identifying the selected payment instrument, information identifying merchant 111, information identifying the products or services associated with, or involved in, the purchase transaction. Further, in some examples, the payment notification may also include digital content that, when presented on a digital interface generated by an application program executed at client device 102 (e.g., mobile banking application 108 of FIG. 1, etc.), prompt user 101 to provide input to client device 102 that approves, or alternatively, declines, the real-time payment requested from user 101 by merchant 111.

Further, and as illustrated in FIG. 6A, FI computing system 130 may also perform any of the exemplary processes described herein to generate one or more elements of a review notification associated with the purchase transaction based on all, or a selected portion, of the decomposed field data (e.g., in step 612 of FIG. 6A). By way of example, and as described herein, FI computing system 130 may perform operations that obtain (e.g., from data records 142C of review data store 142 of FIG. 1) one or more elements of digital content that, when presented on a digital interface generated by the application program executed at client device 102 (e.g., mobile banking application 108 of FIG. 1, etc.), prompt user 101 to provide input to client device 102 that specifies one or more counterparty-, product-, or service-specific reviews associated with the purchase transaction (e.g., the counterparty-, product-, or service-specific reviews of the landscaping project completed by merchant 111). Further, and as described herein, FI computing system 130 may perform operations that package the obtained elements of digital content into a corresponding portion of the review notification, along with an identifier of merchant 111 (e.g., merchant identifier 338) and in some instances, data characterizing an aggregated value of one or more prior counterparty-, product-, or service-specific reviews associated with the purchase transaction.

FI computing system 130 may also perform any of the exemplary processes described herein to package the generated payment notification and review notification into corresponding portions of notification data, along with one or more of the elements of decomposed field data that identify and characterize merchant 111, user 101, the purchase transaction and/or the requested, real-time payment, and to transmit the elements of notification data across network 120 to client device 102 (e.g., in step 614 of FIG. 6A). In some instances, client device 102 may receive the elements of notification data, and an application program executed by the one or more processors of client device 102 (e.g., executed mobile banking application 108) may perform any of the exemplary processes described herein to present, within a corresponding digital interface, a graphical representation of the payment notification that prompts user 101 to approve, or reject, the real-time payment requested by merchant 111, and based on input indicative of the approval or rejection of the requested, real-time payment by user 101, to present, within the corresponding digital interface, a graphical representation of the review notification that prompts user 101 to provide one or more counterparty-, product-, or service-specific reviews associated with the purchase transaction. Exemplary process 600 is then complete in step 616 of FIG. 6A.

Referring to FIG. 6B, client device 102 may perform any of the exemplary processes described herein to receive the elements of notification data from FI computing system 130, and store the elements of notification data within a portion of a tangible, non-transitory memory accessible to client device 102 (e.g., in step 622 of FIG. 6B). Client device 102 may also perform any of the exemplary processes described herein to obtain the payment notification from the received elements of notification data, and generate, and render for presentation within a corresponding digital interface, a graphical representation of the payment notification that prompts user 101 to approve, or alternatively, reject, the real-time payment requested from user 101 by merchant 111 (e.g., in step 624 of FIG. 6B). Further, client device 102 may also receive, via input unit 109B, elements of user input indicative of an approval, or alternatively, a rejection, of the requested, real-time payment by user 101 (e.g., in step 626 of FIG. 6B), and based on the elements of user input, client device 102 may determine whether user 101 approved, or rejected, the requested real-time payment (e.g., in step 628 of FIG. 6B).

If, for example, client device 102 were to determine that user 101 approved the requested, real-time payment (e.g., step 628; YES), client device 102 may perform any of the exemplary processes described herein to process the elements of input data and generate a payment confirmation indicative of the approval, by user 101, of the requested real-time payment (e.g., in step 630 of FIG. 6B). Client device 102 may also perform any of the exemplary processes described herein to obtain the review notification from the received elements of notification data, and to generate, and render for presentation within a corresponding digital interface, a graphical representation of the review notification that prompts user 101 to provide input to client device 102 specifying one or more counterparty-, product-, or service-specific reviews associated with the purchase transaction, or alternatively, to decline to provision any of the counterparty-, product-, or service-specific reviews (e.g., in step 632 of FIG. 6B). Further, client device 102 may also receive, via input unit 109B, additional elements of user input responsive to the presented graphical representation of the review notification (e.g., in step 634 of FIG. 6B). In some instances, as described herein, the additional elements of input data may be indicative of, or may specify, the one or more counterparty-, product-, or service-specific reviews associated with the purchase transaction and provisioned by user 101, or alternatively, may be indicative of a decision by user 101 to decline to provision any of the counterparty-, product-, or service-specific reviews.

Based on the additional elements of user input, client device 102 may determine whether user 101 provisioned the one or more counterparty-, product-, or service-specific reviews associated with the purchase transaction, or alternatively, declined to provision any of the counterparty-, product-, or service-specific reviews (e.g., in step 636 of FIG. 6B). If client device 102 were to determine that user 101 provisioned the one or more counterparty-, product-, or service-specific reviews associated with the purchase transaction (e.g., step 636; YES), client device 102 may perform any of the exemplary processes described herein to generate elements of customer review data that characterize each of the provisioned counterparty-, product-, or service-specific reviews associated with the purchase transaction (e.g., in step 638 of FIG. 6B).

Client device 102 may also perform any of the exemplary processes described herein to generate elements of response data that include the payment confirmation and the elements of customer review data, and in some instances, the identifier of merchant 111 and/or the identifier of user 101, and to transmit the elements of response data across network 120 to FI computing system 130 (e.g., in step 640 of FIG. 6B). Exemplary process 650 is then complete in step 642.

Referring back to step 636, if client device 102 were to determine that user 101 declined to provision any counterparty-, product-, or service-specific reviews associated with the initiated purchase transaction (e.g., step 636; NO), client device 102 may perform any of the exemplary processes described herein to generate elements of customer review data that indicate, and confirm, the decision of user 101 to decline to provision any of the counterparty-, product-, or service-specific reviews (e.g., in step 644 of FIG. 6B). Exemplary process 650 may then pass back to step 640, and client device 102 may also perform any of the exemplary processes described herein to generate elements of response data that include the payment confirmation and the elements of customer review data, and in some instances, the identifier of merchant 111 and/or the identifier of user 101.

Further, and referring back to step 628, if client device 102 were to determine that user 101 rejected the requested, real-time payment (e.g., step 628; NO), client device 102 may perform any of the exemplary processes described herein to generate an additional payment confirmation indicating the rejection of the requested, real-time payment by user 101 (e.g., in step 646 of FIG. 6B), and to generate elements of additional response data that include the additional payment confirmation in conjunction with the identifier of user 101 and/or merchant 111 (e.g., in step 648 of FIG. 6B). Client device 102 may also transmit the elements of additional response data across network 120 to FI computing system 130 (e.g., also in step 648 of FIG. 6B). Exemplary process 650 is then complete in step 642.

Referring to FIG. 6C, FI computing system 130 may receive the elements of response data from client device 102, and may store the received elements of response data within one or more tangible, non-transitory memories accessible to FI computing system 130, such as in conjunction with the elements of decomposed field data within data repository 134 (e.g., in step 652 of FIG. 6C). FI computing system 130 may also perform any of the exemplary processes described herein to obtain, from the elements of response data, the payment confirmation indicative of the approval, or alternatively, the rejection, of the real-time payment request from user 101 by merchant 111 (e.g., in step 654 of FIG. 6C), and to process the payment confirmation and to determine whether user 101 approved, or rejected, the real-time payment (e.g., in step 656 of FIG. 6C).

If, for example, FI computing system 130 were to determine that user 101 approved the requested, real-time payment (e.g., step 656; YES), FI computing system 130 may perform any of the exemplary processes described herein to execute the now-approved real-time payment based on the payment confirmation and in accordance with the elements of decomposed field data (e.g., in step 658 of FIG. 6C). By way of example, in step 658, FI computing system 130 may perform any of the exemplary processes described herein to obtain the identifier of user 101 from the elements of response data, to access the elements of decomposed field data, and based on the identifier of user 101, to obtain account data that identifies the payment instrument held by user 101 and capable of funding the real-time payment and a payment amount of the real-time payment. FI computing system 130 may also perform operations in step 658 that, in real-time, debit the payment amount from the account associated with the payment instrument, and transmit one or more additional ISO-20022-compliant RTP messages that confirm the approval of the requested, real-time payment by user 101 and the real-time debiting of the payment amount from the account associated with the payment instrument. FI computing system 130 may also perform operations that access the RFP message maintained within RFP message queue 136, and delete the RFP message from RFP message queue 136 (e.g., in step 660).

FI computing system 130 may also perform operations that obtain elements of customer review data from the elements of response data (e.g., in step 662 of FIG. 6C), and based on the elements of customer review data, that determine whether user 101 provisioned the one or more counterparty-, product-, or service-specific reviews associated with the purchase transaction, or alternatively, declined to provision any of the counterparty-, product-, or service-specific reviews (e.g., in step 664 of FIG. 6C). If FI computing system 130 were to determine that user 101 provisioned the one or more counterparty-, product-, or service-specific reviews associated with the purchase transaction (e.g., step 664; YES), FI computing system 130 may perform any of the exemplary processes described herein to store the elements of customer review data, which includes the one or more counterparty-, product-, or service-specific reviews associated with the purchase transaction and provisioned by user 101, within a portion of review data store 142 associated with user 101 (e.g., in step 666 of FIG. 6C). Further, FI computing system 130 may also perform any of the exemplary processes described herein to generate an aggregated value of one or more of the counterparty-, product-, or service-specific reviews based on the elements of customer review data and one or more previously provisioned counterparty-, product-, or service-specific reviews, and to store the aggregated values of the counterparty-, product-, or service-specific reviews within an additional portion of review data store 142 (e.g., in step 668 of FIG. 6C).

In some instances, FI computing system 30 may also perform any of the exemplary processes described herein to generate, and provision to merchant computing system 110, a merchant notification that includes all, or a selected portion of, the counterparty-, product-, or service-specific reviews associated with the initiated purchase transaction, and all, or a selected portion of, the aggregated values of these counterparty-, product-, or service-specific reviews (e.g., in step 670 of FIG. 6C). Further, FI computing system 130 may also perform any of the exemplary processes described herein to receive, and respond to, queries of the aggregated values of the counterparty-, product-, or service-specific reviews maintained within review data store 142 by FI computing system 130 via a corresponding digital portal (e.g., in step 672). Exemplary process 650 is then complete in step 674.

Referring back to step 656, if FI computing system 130 were to determine that user 101 rejected the requested, real-time payment (e.g., step 656; NO), FI computing system 130 may perform any of the exemplary processes described herein to broadcast one or more additional ISO-20022-compliant RTP messages that confirm the rejection of the requested, real-time payment by user 101 (e.g., in step 676 of FIG. 6C). FI computing system 130 may also perform operations that access the RFP message maintained within RFP message queue 136, and delete the RFP message from RFP message queue 136 (e.g., in step 678 of FIG. 6C). Exemplary process 650 may pass back to step 672, and FI computing system 130 may perform any of the exemplary processes described herein to receive, and respond to, queries of the aggregated values of the counterparty-, product-, or service specific reviews maintained within review data store 142 by FI computing system 130 via a corresponding digital portal.

Further, and referring back to step 664, if FI computing system 130 were to determine that user 101 declined to provision any of the counterparty-, product-, or service-specific reviews associated with the initiated purchase transaction (e.g., step 664; NO), exemplary process 650 may pass back to step 672, and FI computing system 130 may perform any of the exemplary processes described herein to receive, and respond to, queries of the aggregated counterparty-, product-, or service specific reviews maintained within review data store 142 by FI computing system 130 via a corresponding digital portal.

III. Exemplary Hardware and Software Implementations

Embodiments of the subject matter and the functional operations described in this disclosure can be implemented in digital electronic circuitry, in tangibly-embodied computer software or firmware, in computer hardware, including the structures disclosed in this specification and their structural equivalents, or in combinations of one or more of them. Embodiments of the subject matter described in this disclosure, including web browser 106, mobile banking application 108, decomposition engine 146, analytical engine 148, notification engine 150, RTP engine 152, review aggregation engine 154, query engine 156, application program 202, RTP engine 214, APIs 302, 346, 403, and 422, URL processing module 318, remittance analysis module 322, notification module 348, RTP module 358, interface element generation module 350, verified review module 380, application program 438, and interface element generation module 440, can be implemented as one or more computer programs, i.e., one or more modules of computer program instructions encoded on a tangible non-transitory program carrier for execution by, or to control the operation of, a data processing apparatus (or a computing system). Additionally, or alternatively, the program instructions can be encoded on an artificially-generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them The terms "apparatus," "device," and "system" refer to data processing hardware and encompass all kinds of apparatus, devices, and machines for processing data, including by way of example a programmable processor, a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, an application program, an engine, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) or an assisted Global Positioning System (AGPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, such as user 101, embodiments of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a client computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the disclosure or of what may be claimed, but rather as descriptions of features specific to particular embodiments of the disclosure. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, unless otherwise specifically defined herein, all terms are to be given their broadest possible interpretation including meanings implied from the specification as well as meanings understood by those skilled in the art and/or as defined in dictionaries, treatises, etc. It is also noted that, as used in the specification and the appended claims, the singular forms "a," "an," and "the" include plural referents unless otherwise specified, and that the terms "comprises" and/or "comprising," when used in this specification, specify the presence or addition of one or more other features, aspects, steps, operations, elements, components, and/or groups thereof. Moreover, the terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship. In this disclosure, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only and are not to be construed as limiting the described subject matter.

The foregoing is provided for purposes of illustrating, explaining, and describing embodiments of this disclosure.

Modifications and adaptations to the embodiments will be apparent to those skilled in the art and may be made without departing from the scope or spirit of the disclosure.

What is claimed is:

1. An apparatus comprising:
a communications interface;
a memory storing instructions; and
at least one processor coupled to the communications interface and to the memory, the at least one processor being configured to execute the instructions to:
receive, via the communications interface and from a computing system operable by a first counterparty, a message associated with an exchange of data involving the first counterparty and a second counterparty, the message comprising elements of message data disposed within corresponding message fields, the message data characterizing a real-time payment requested from the second counterparty by the first counterparty, the message data comprising a uniform resource locator associated with formatted data characterizing the exchange of data, and the formatted data being maintained by a computing system operable by the first counterparty;
based on the uniform resource locator, perform operations that request and receive at least a portion of the formatted data from the computing system via the communications interface;
determine a first identifier of the first counterparty based on the portion of the formatted data, and transmit, via the communications interface, notification data to a device operable by the second counterparty, the notification data comprising the first identifier and digital content, and the notification data causing an application program executed at the device to present the first identifier and at least a portion of the digital content within a digital interface;
receive, from the device via the communications interface, confirmation data indicative of an approval of an execution of the data exchange by the second counterparty and review data indicative of a review associated with the data exchange;
based on the confirmation data, store the first identifier and the review data in the memory and perform operations that execute the data exchange;
receive query data from the device via the communications interface, the query data comprising at least one of a portion of a counterparty identifier, a value of a counterparty characteristic, or a value of a geographic characteristic;
based on the received query data, obtain elements of aggregated review data characterizing one or more prior reviews associated with a plurality of candidate counterparties over a prior temporal interval, each of the elements of aggregated review data comprising an identifier of a corresponding one of the plurality of candidate counterparties, a value of at least one of a corresponding counterparty or geographic characteristic, and an aggregate value representative of the one or more prior reviews associated with the corresponding candidate counterparty over the prior temporal interval, and based on the aggregated review data, determine that a subset of the candidate counterparties are consistent with the query data; and
transmit, to the device via the communications interface, response data that includes at least a portion of the aggregated review data associated with the subset of the candidate counterparties, the device being configured to present a graphical representation of the least a portion of the response data within an additional digital interface.

2. The apparatus of claim 1, wherein the at least one processor is further configured to execute the instructions to:
obtain, from the memory, mapping data associated with the message fields of the received message;
perform operations that obtain the elements of the message data from the message fields based on the mapping data; and
store the elements of the message data within the memory, the elements of the message data comprising the first identifier, a second identifier of the second counterparty, and a value of a parameter characterizing the data exchange.

3. The apparatus of claim 2, wherein:
the received message comprises a request-for-payment message, the message fields of the request-for-payment message being structured in accordance with a standardized data-exchange protocol; and
elements of the mapping data identify corresponding ones of the elements of the message data and corresponding ones of the message fields.

4. The apparatus of claim 2, wherein the at least one processor is further configured to execute the instructions to:
based on the confirmation data, determine that the second counterparty approved the execution of the data exchange; and
based on the determined approval of the second counterparty, perform operations that execute the data exchange in accordance with at least the parameter value.

5. The apparatus of claim 4, wherein the at least one processor is further configured to execute the instructions to:
store the received message within a message queue; and
delete the stored message within the message queue based on the determined approval of the second counterparty.

6. The apparatus of claim 1, wherein:
the review data comprises a numerical rating associated with the review; and
the at least one processor is further configured to execute the instructions to:
obtain additional review data characterizing one or more prior reviews associated with the data exchange during the prior temporal interval, each of the prior reviews being associated with a corresponding numerical rating;
perform operations that generate an aggregate value representative of the numerical ratings associated with the review and with at least a subset of the prior reviews associated with the data exchange; and
based on the confirmation data, generate aggregated review data that includes the aggregate value and store the aggregated review data within the memory.

7. The apparatus of claim 2, wherein the at least one processor is further configured to execute the instructions to obtain the uniform resource locator from one or more of the message fields based on the mapping data.

8. The apparatus of claim 7, wherein the at least one processor is further configured to execute the instructions to extract at least one of the first identifier, the second identifier, or an additional parameter value characterizing the data exchange from corresponding portions of the uniform resource locator.

9. The apparatus of claim 7, wherein the at least one processor is further configured to execute the instructions to process one or more elements of the formatted data, and obtain at least one of the first identifier, the second identifier, or an additional parameter value characterizing the data exchange from the processed elements of formatted data.

10. The apparatus of claim 1, wherein the at least one processor is further configured to transmit, via the communications interface, counterparty notification data to the computing system operable by the first counterparty, the counterparty notification data comprising at least a portion of the review data, and the computing system being configured to present a graphical representation of the least the portion of the review data within the digital interface.

11. The apparatus of claim 1, wherein the at least one processor is further configured to execute the instructions to generate the response data, the response data comprising the candidate identifier and the aggregate value of each of the subset of the candidate counterparties.

12. The apparatus of claim 1, wherein:
the data exchange comprises a transaction, the first counterparty comprises a merchant, and the second counterparty comprises a customer of the merchant;
the transaction is associated with at least one of a product or service; and
the review comprises a counterparty-specific review of the merchant, a product-specific review of the product, or a service-specific review of the service.

13. A computer-implemented method, comprising:
receiving, using at least one processor, and from a computing system operable by a first counterparty, a message associated with an exchange of data involving the first counterparty and a second counterparty, the message comprising elements of message data disposed within corresponding message fields, the message data characterizing a real-time payment requested from the second counterparty by the first counterparty, the message data comprising a uniform resource locator associated with formatted data characterizing the exchange of data, and the formatted data being maintained by a computing system operable by the first counterparty;
based on the uniform resource locator, performing operations, using the at least one processor, that request and receive at least a portion of the formatted data from the computing system;
using the at least one processor, determining a first identifier of the first counterparty based on the portion of the formatted data, and transmitting notification data to a device operable by the second counterparty, the notification data comprising the first identifier and digital content, and the notification data causing an application program executed at the device to present the first identifier and at least a portion of the digital content within a digital interface;
receiving, from the device, and using the at least one processor, confirmation data indicative of an approval of an execution of the data exchange by the second counterparty and review data indicative of a review associated with the data exchange; and
based on the confirmation data, and using the at least one processor, storing the first identifier and the review data with a data repository, and performing operations that execute the data exchange;
receiving query data from the device using the at least one processor, the query data comprising at least one of a portion of a counterparty identifier, a value of a counterparty characteristic, or a value of a geographic characteristic;
based on the received query data, and using the at least one processor, obtaining elements of aggregated review data characterizing one or more prior reviews associated with a plurality of candidate counterparties over a prior temporal interval, each of the elements of aggregated review data comprising an identifier of a corresponding one of the plurality of candidate counterparties, a value of at least one of a corresponding counterparty or geographic characteristic, and an aggregate value representative of the one or more prior reviews associated with the corresponding candidate counterparty over the prior temporal interval, and based on the aggregated review data, determining that a subset of the candidate counterparties are consistent with the query data; and
transmitting, to the device, and using the at least one processor, response data that includes at least a portion of the aggregated review data associated with the subset of the candidate counterparties, the device being configured to present a graphical representation of the least a portion of the response data within an additional digital interface.

14. The computer-implemented method of claim 13, further comprising:
obtaining, using the at least one processor, mapping data associated with the message fields of the received message;
obtaining, using the at least one processor, the elements of the message data from the message fields based on the mapping data; and
storing, using the at least one processor, the elements of the message data within the data repository, the elements of the message data comprising the first identifier, a second identifier of the second counterparty, and a value of a parameter characterizing the data exchange.

15. The computer-implemented method of claim 14, wherein:
the received message comprises a request-for-payment message, the message fields of the request-for-payment message being structured in accordance with a standardized data-exchange protocol; and
elements of the mapping data identify corresponding ones of the elements of the message data and corresponding ones of the message fields.

16. The computer-implemented method of claim 14, further comprising:
based on the confirmation data, determining, using the at least one processor, that the second counterparty approved the execution of the data exchange; and
based on the determined approval of the second counterparty, performing operations, using the at least one processor, that execute the data exchange in accordance with at least the parameter value.

17. The computer-implemented method of claim 13, wherein:
the review data comprises a numerical rating associated with the review; and
the computer-implemented method further comprises:
obtaining, using the at least one processor, additional review data characterizing one or more prior reviews associated with the data exchange during the prior temporal interval, each of the prior reviews being associated with a corresponding numerical rating;
performing operations, using the at least one processor, that compute an aggregate value representative of the numerical ratings associated with the review and with at least a subset of the prior reviews associated with the data exchange; and based on the confirmation data, and using the at least one processor, generating aggregated review data the includes the aggregate value, and storing the aggregated review data within the data repository.

18. The computer-implemented method of claim 14, further comprising:

based on the mapping data, obtaining, using the at least one processor, the uniform resource locator from one or more of the message fields; and using the at least one processor, processing one or more elements of the formatted data, and obtaining at least one of the first identifier, the second identifier, or an additional parameter value characterizing the data exchange from the processed elements of formatted data.

19. The computer-implemented method of claim 13, wherein:

the data exchange comprises a transaction, the first counterparty comprises a merchant, and the second counterparty comprises a customer of the merchant;

the transaction is associated with at least one of a product or service; and the review comprises a counterparty-specific review of the merchant, a product-specific review of the product, or a service-specific review of the service.

20. A tangible, non-transitory computer-readable medium storing instructions that, when executed by at least one processor, cause the at least one processor to perform a method, comprising:

receiving, from a computing system operable by a first counterparty, a message associated with an exchange of data involving the first counterparty and a second counterparty, the message comprising elements of message data disposed within corresponding message fields, the message data characterizing a real-time payment requested from the second counterparty by the first counterparty, the message data comprising a uniform resource locator associated with formatted data characterizing the exchange of data, and the formatted data being maintained by a computing system operable by the first counterparty;

based on the uniform resource locator, performing operations, using the at least one processor, that request and receive at least a portion of the formatted data from the computing system;

determining an identifier of the first counterparty based on the portion of the formatted data, and transmitting notification data to a device operable by the second counterparty, the notification data comprising the identifier and digital content, and the notification data causing an application program executed at the device to present the identifier and at least a portion of the digital content within a digital interface;

receiving, from the device, confirmation data indicative of an approval of an execution of the data exchange by the second counterparty and review data indicative of a review associated with the data exchange;

based on the confirmation data, storing the identifier and the review data with a data repository, and performing operations that execute the data exchange;

receiving, from the device, query data that includes at least one of a portion of a counterparty identifier, a value of a counterparty characteristic, or a value of a geographic characteristic;

based on the received query data, obtaining elements of aggregated review data characterizing one or more prior reviews associated with a plurality of candidate counterparties over a prior temporal interval, each of the elements of aggregated review data comprising an identifier of a corresponding one of the plurality of candidate counterparties, a value of at least one of a corresponding counterparty or geographic characteristic, and an aggregate value representative of the one or more prior reviews associated with the corresponding candidate counterparty over the prior temporal interval, and based on the aggregated review data, determining that a subset of the candidate counterparties are consistent with the query data; and transmitting, to the device response data that includes at least a portion of the aggregated review data associated with the subset of the candidate counterparties, the device being configured to present a graphical representation of the least a portion of the response data within an additional digital interface.

21. The apparatus of claim 1, wherein:

the device is configured to execute an additional application program, and the executed additional application program causes the device to initiate the data exchange;

the at least one processor is further configured to execute the instructions to transmit the notification data to the device prior to an execution of the data exchange by the apparatus; and the notification data causes the application program executed at the device to present the first identifier and the portion of the digital content within the digital interface, and to generate the review data, prior to the execution of the data exchange by the apparatus.

22. The apparatus of claim 1, wherein:

the at least one processor is further configured to execute the instructions to determine a value of a parameter characterizing the data exchange based on the portion of the formatted data;

the notification data further comprises the parameter value; and the notification data further causes the application program executed at the device to present the first identifier, the parameter value, and at least a portion of the digital content within the digital interface.

23. The apparatus of claim 1, wherein:

the review data comprises a numerical rating associated with the review; and the at least one processor is further configured to execute the instructions to:

obtain additional review data characterizing one or more prior reviews associated with the first counterparty during the prior temporal interval, each of the prior reviews being associated with a corresponding numerical rating;

generate an aggregate value representative of the numerical ratings associated with the review and with at least a subset of the prior reviews; and based on the confirmation data, generate at least one element of the aggregated review data that includes the aggregate value and store the at least one element of the aggregated review data and the first identifier within the memory.

24. The computer-implemented method of claim 13, further comprising generating the response data using the at least one processor, the response data comprising the candidate identifier and the aggregate value of each of the subset of the candidate counterparties.

\* \* \* \* \*